US012440651B2

(12) United States Patent
Ishida

(10) Patent No.: US 12,440,651 B2
(45) Date of Patent: Oct. 14, 2025

(54) CATHETER ASSEMBLY

(71) Applicant: TERUMO KABUSHIKI KAISHA, Tokyo (JP)

(72) Inventor: Masahiro Ishida, Kanagawa (JP)

(73) Assignee: TERUMO KABUSHIKI KAISHA, Tokyo (JP)

(*) Notice: Subject to any disclaimer, the term of this patent is extended or adjusted under 35 U.S.C. 154(b) by 504 days.

(21) Appl. No.: 17/206,601

(22) Filed: Mar. 19, 2021

(65) Prior Publication Data
US 2021/0205588 A1 Jul. 8, 2021

Related U.S. Application Data

(63) Continuation of application No. PCT/JP2019/036517, filed on Sep. 18, 2019.

(30) Foreign Application Priority Data

Sep. 25, 2018 (JP) ................. 2018-179355

(51) Int. Cl.
A61M 25/06 (2006.01)
A61M 5/158 (2006.01)
(Continued)

(52) U.S. Cl.
CPC .... A61M 25/0606 (2013.01); A61M 25/0097 (2013.01); A61M 25/02 (2013.01);
(Continued)

(58) Field of Classification Search
CPC .............. A61M 25/0606; A61M 25/02; A61M 25/0097; A61M 2005/1585;
(Continued)

(56) References Cited

U.S. PATENT DOCUMENTS 4,342,313 A * 8/1982 Chittenden ........ A61M 25/0113
604/523
5,053,004 A * 10/1991 Markel ............... A61M 5/1582
29/428

(Continued)

FOREIGN PATENT DOCUMENTS

JP 2013-529116 A 7/2013
JP 2016-530934 A 10/2016
(Continued)

OTHER PUBLICATIONS

International Searching Authority, "International Search Report," issued in connection with International Patent Application No. PCT/JP2019/036517, dated Dec. 3, 2019.
(Continued)

Primary Examiner — William R Carpenter
Assistant Examiner — Robert F Allen
(74) Attorney, Agent, or Firm — Foley & Lardner LLP

(57) ABSTRACT

A catheter assembly includes an inner needle, a needle hub, a catheter, and a catheter hub. The catheter assembly further includes: a catheter operation member that enables the relative movement of the catheter and the catheter hub with respect to the inner needle; a support member that supports the catheter when the catheter is moved; and a connector that is connected to the catheter hub and is connectable with another medical device. Further, the catheter assembly includes a restriction portion that restricts free displacement of the connector with respect to the catheter hub.

13 Claims, 22 Drawing Sheets

(51) Int. Cl.
*A61M 25/00* (2006.01)
*A61M 25/01* (2006.01)
*A61M 25/02* (2006.01)
*A61M 39/08* (2006.01)
*A61M 39/22* (2006.01)

(52) U.S. Cl.
CPC ........ *A61M 25/0612* (2013.01); *A61M 39/22* (2013.01); *A61M 2005/1585* (2013.01); *A61M 2005/1587* (2013.01); *A61M 25/0026* (2013.01); *A61M 2025/0175* (2013.01); *A61M 2025/024* (2013.01); *A61M 2039/082* (2013.01)

(58) Field of Classification Search
CPC ...... A61M 2005/1587; A61M 25/0113; A61M 25/0026; A61M 25/0606; A61M 2025/09008; A61M 25/0693; A61M 2039/082; A61M 2025/0175
See application file for complete search history.

(56) References Cited

U.S. PATENT DOCUMENTS

| | | | | |
|---|---|---|---|---|
| 5,312,359 A * | 5/1994 | Wallace | ............ | A61M 25/0631 604/164.08 |
| 5,951,523 A * | 9/1999 | Osterlind | .......... | A61M 25/0631 604/198 |
| 2011/0282285 A1* | 11/2011 | Blanchard | ......... | A61M 25/0097 604/164.08 |
| 2013/0023826 A1* | 1/2013 | Ishida | ............... | A61M 25/0606 604/165.02 |
| 2014/0031752 A1* | 1/2014 | Blanchard | ......... | A61M 25/0618 604/164.13 |
| 2015/0231364 A1* | 8/2015 | Blanchard | ....... | A61M 25/09041 604/164.08 |
| 2016/0206858 A1* | 7/2016 | Ishida | ............... | A61M 25/0612 |
| 2016/0220786 A1* | 8/2016 | Mitchell | ............ | A61M 25/0029 |
| 2016/0331940 A1* | 11/2016 | Ishida | ............... | A61M 39/0606 |
| 2017/0028171 A1* | 2/2017 | Ishida | ............... | A61M 25/0668 |
| 2017/0043132 A1* | 2/2017 | Ishida | ............... | A61M 25/0606 |
| 2017/0120014 A1 | 5/2017 | Harding et al. | | |
| 2017/0368308 A1* | 12/2017 | Hofius | ............... | A61M 25/0097 |
| 2018/0008803 A1* | 1/2018 | Muramatsu | ....... | A61M 25/0631 |
| 2018/0154112 A1* | 6/2018 | Chan | ................. | A61M 25/0606 |
| 2018/0207406 A1* | 7/2018 | Ishida | ............... | A61M 25/0631 |
| 2019/0175878 A1* | 6/2019 | Ishida | ............... | A61M 25/0606 |

FOREIGN PATENT DOCUMENTS

| | | |
|---|---|---|
| JP | 2017-195937 A | 11/2017 |
| JP | 2018-519109 A | 7/2018 |
| WO | WO-2006/027923 A1 | 3/2006 |
| WO | WO-2011/146764 A1 | 11/2011 |
| WO | WO-2015/023358 A1 | 2/2015 |
| WO | WO-2018/038029 A1 | 3/2018 |

OTHER PUBLICATIONS

International Searching Authority, "Written Opinion," issued in connection with International Patent Application No. PCT/JP2019/036517, dated Dec. 3, 2019.

\* cited by examiner

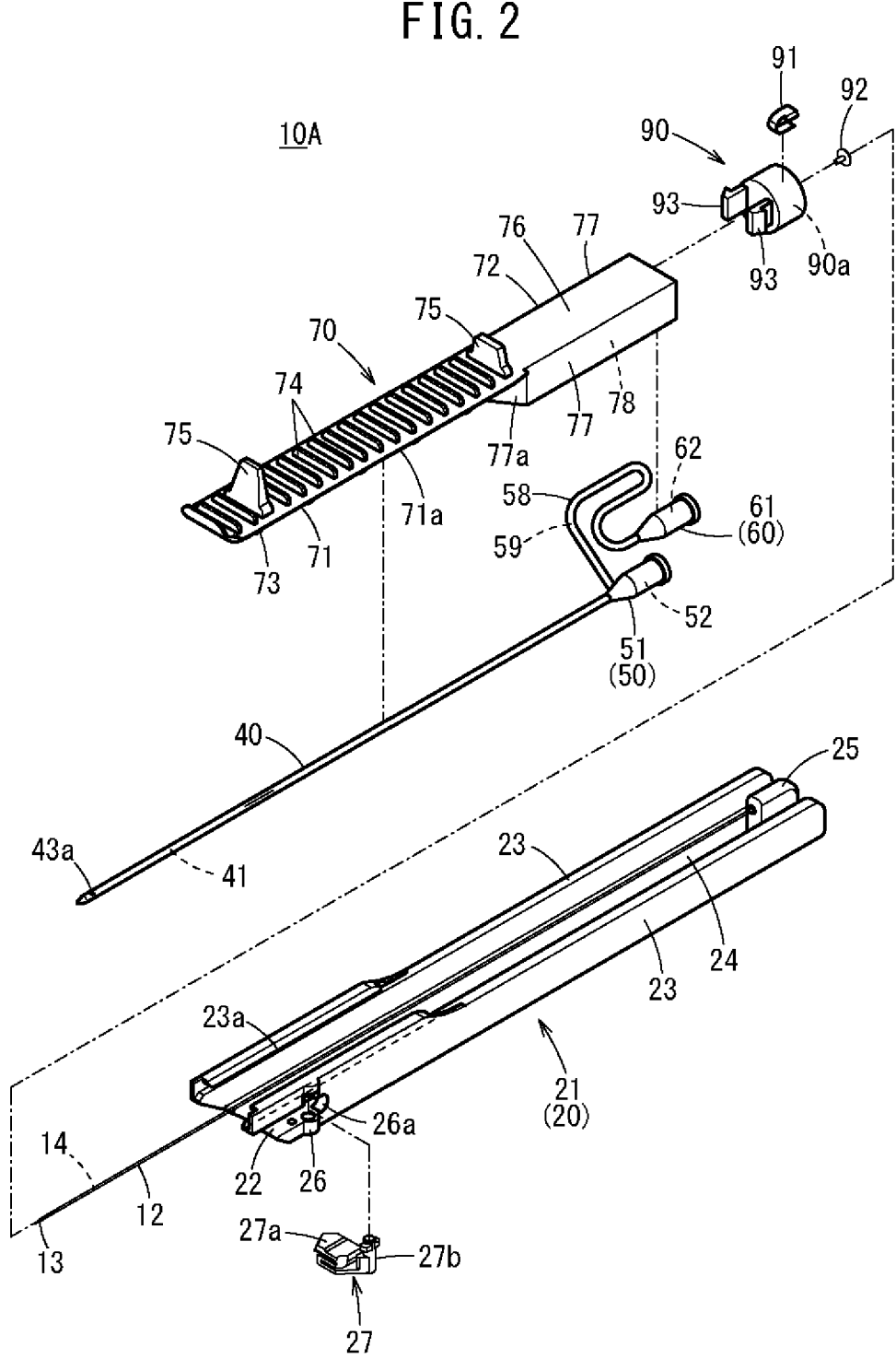

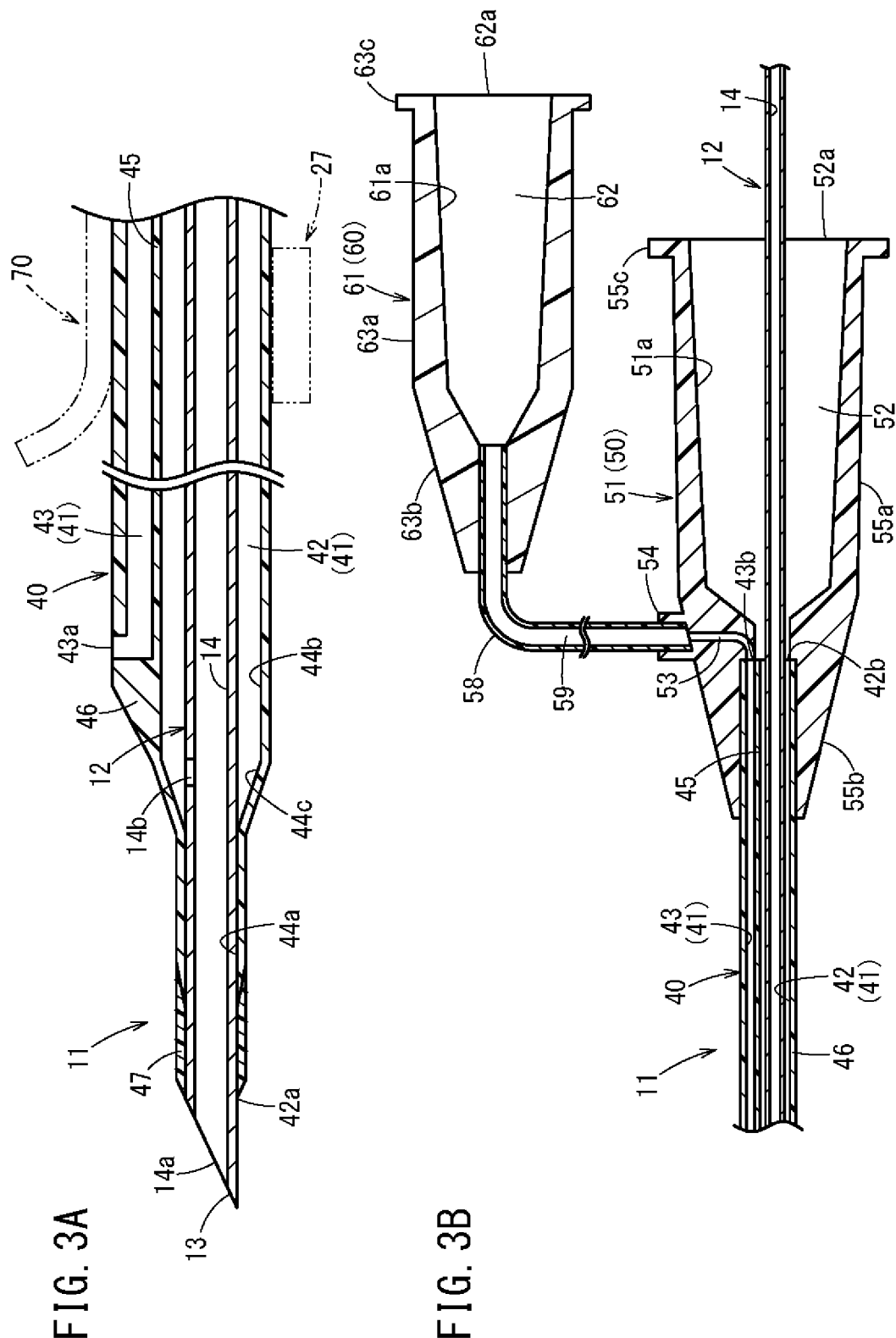

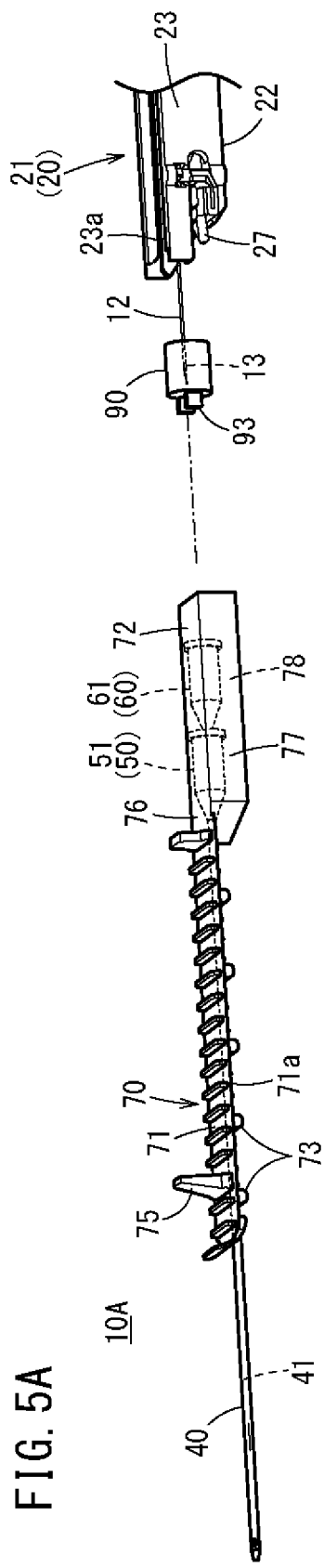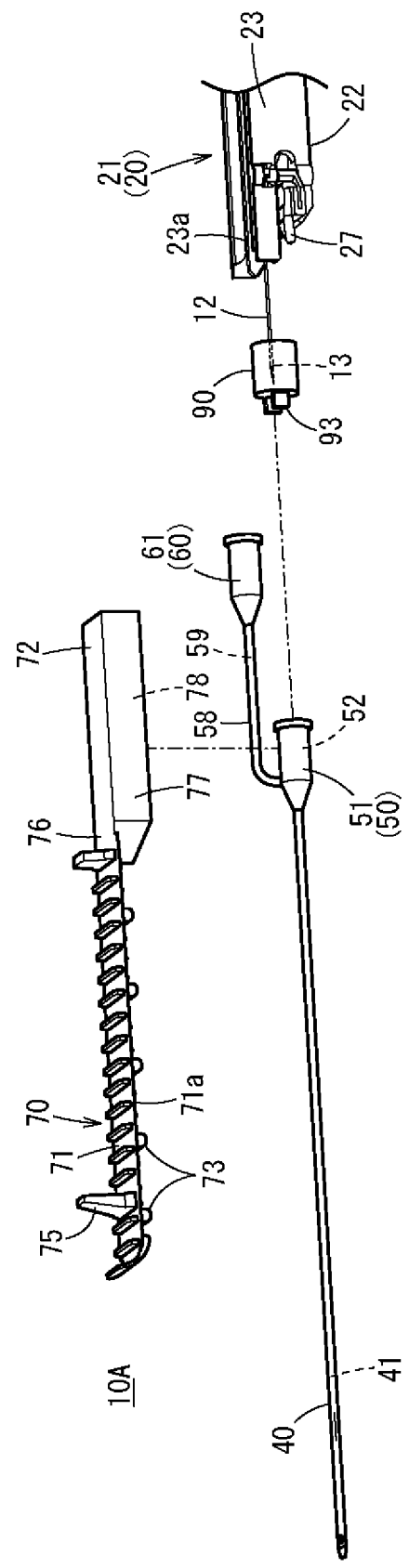
FIG. 5A
FIG. 5B

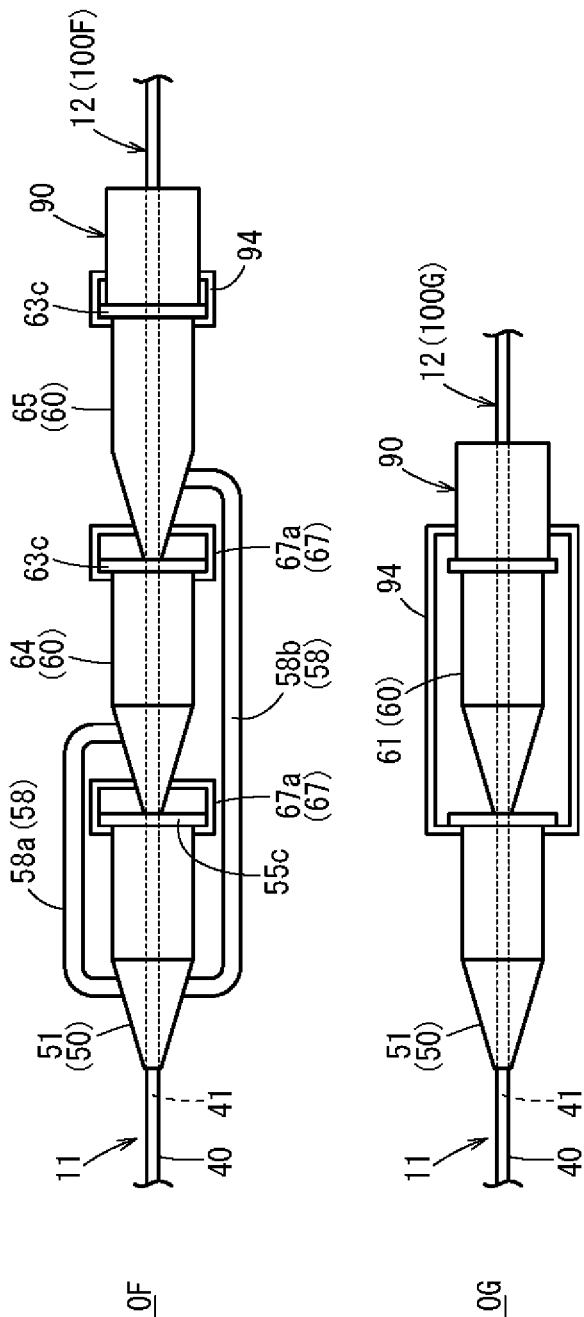
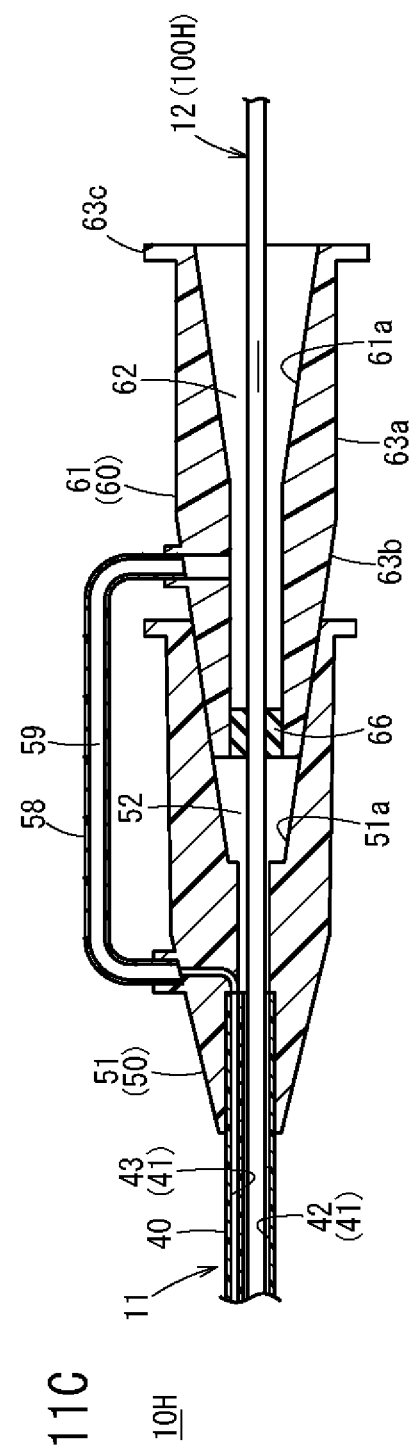
FIG. 11A
FIG. 11B
FIG. 11C

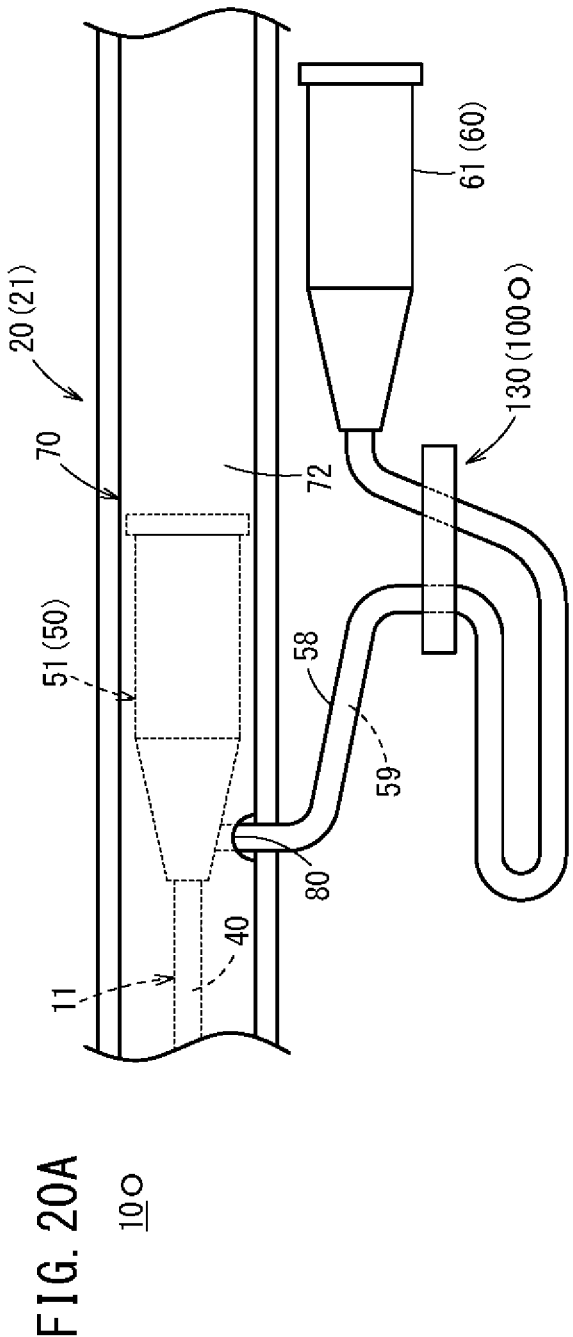
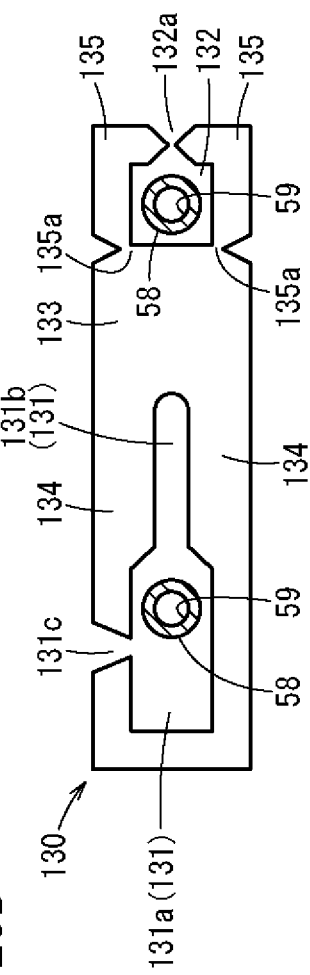
FIG. 20A
FIG. 20B

CATHETER ASSEMBLY

CROSS-REFERENCE TO RELATED APPLICATIONS

This application is a bypass continuation of PCT Application No. PCT/JP2019/036517, filed on Sep. 18, 2019, which claims priority to Japanese Application No. 2018-179355, filed on Sep. 25, 2018. The contents of these applications are hereby incorporated by reference in their entireties.

BACKGROUND

The present disclosure relates to, for example, a catheter assembly used when performing an infusion, a blood transfusion, or the like.

When forming an introduction unit for an infusion or a blood transfusion on a patient, a catheter assembly (catheter insertion device) having a multi-structure needle with an inner needle (needle cannula) inserted in a catheter is used, as disclosed in JP 2016-530934 A, for example. In the use of this catheter assembly, a user punctures a patient with the multi-structure needle and advances the catheter relative to the inner needle to insert the catheter into a blood vessel, and further, withdraw the inner needle from the catheter to cause the catheter to remain indwelled.

In addition, one end of an extension line is connected to a catheter hub (rigid hub) fixing a proximal end of the catheter in the catheter assembly disclosed in JP 2016-530934 A. A connector (extension line hub) to which a medical device can be connected is fixed to an end portion of this extension line.

SUMMARY

In the catheter assembly disclosed in JP 2016-530934 A, the user's puncturing operation is performed in a state in which a connector can be freely displaced in a configuration in which the connector is connected to the catheter hub via a relay tube (extension line). When the connector is in a free state in this manner, the connector becomes an obstacle so that it is difficult to puncture the patient. It is conceivable that the user grips the tube or connector together with the needle hub (handle) that fixes the inner needle at the time of puncturing. In this case, the operability at the time of inserting the catheter (advancing the catheter relative to the inner needle) is reduced.

Certain embodiments of the present invention have been developed to solve the above problem, and one object thereof is to provide a catheter assembly having improving usability even in a configuration in which a connector is connected to a catheter hub.

According to one embodiment, a catheter assembly includes: an inner needle; a needle hub fixed to a proximal end of the inner needle; a catheter through which the inner needle is inserted; a catheter hub through which the inner needle is inserted and that is fixed to a proximal end of the catheter; a catheter operation member capable of operating relative movement of the catheter and the catheter hub with respect to the inner needle; a support portion that supports the catheter when the catheter is moved; a connector that is connected to the catheter hub and is connectable with another medical device; and a restriction portion that restricts free displacement of the connector with respect to the catheter hub.

Because the catheter assembly described above includes the restriction portion that restricts the free displacement of the connector with respect to the catheter hub, the connector is prevented from interfering with a user's operation during puncturing, in which the inner needle and the catheter are punctured, and during insertion, in which the catheter is inserted into a body. That is, the catheter assembly can be significantly improved in usability even in a configuration in which the connector is connected to the catheter hub.

BRIEF DESCRIPTION OF DRAWINGS

FIG. 2 is an exploded perspective view of the catheter assembly of FIG. 1;

FIG. 3A is a side cross-sectional view illustrating a distal side of a multi-structure needle in an initial state;

FIG. 3B is a plan cross-sectional view illustrating a catheter hub and a connector in the initial state;

FIG. 5A is a third explanatory view illustrating the operation of the catheter assembly during use;

FIG. 5B is a fourth explanatory view illustrating the operation of the catheter assembly during use;

FIG. 11A is a partial plan view of a catheter assembly according to a fifth modification;

FIG. 11B is a partial plan view of a catheter assembly according to a sixth modification;

FIG. 11C is a partial plan cross-sectional view of a catheter assembly according to a seventh modification;

FIG. 20A is a partial plan view of a catheter assembly according to a fourteenth modification;

FIG. 20B is a plan view of a clamp of FIG. 20A;

DETAILED DESCRIPTION

Hereinafter, preferred embodiments of the present invention will be described in detail with reference to the accompanying drawings.

First Embodiment

Figure 1:
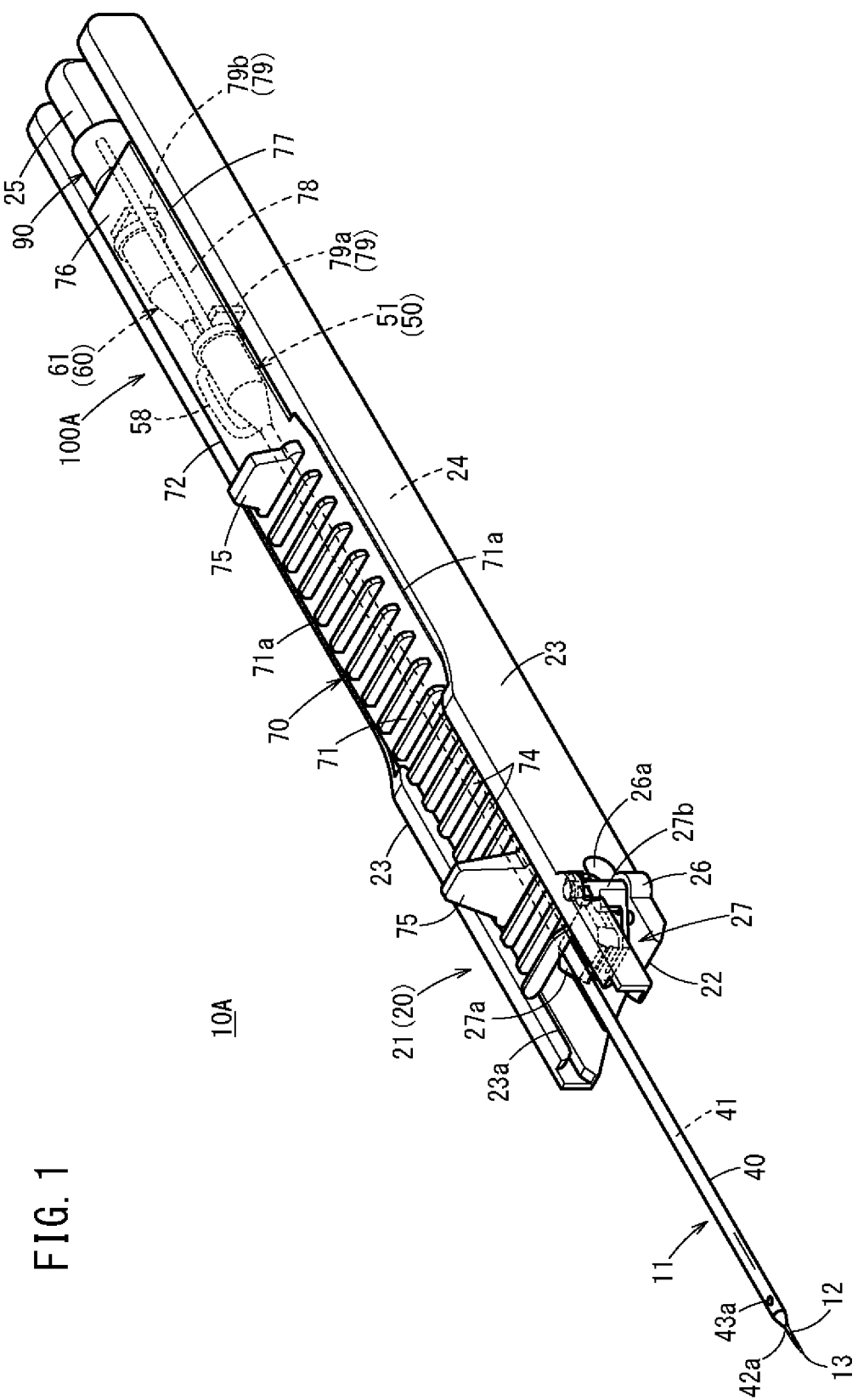
FIG. 1 is a perspective view of a catheter assembly according to one embodiment of the present invention.

A catheter assembly 10A according to a first embodiment of the present invention has a catheter 40 that is inserted to indwell inside a patient's body (living body), as illustrated in FIG. 1, and is used to form an inlet/outlet for a liquid (a medicinal liquid and blood) during an infusion, a blood transfusion, or the like. A catheter 40 according to the present embodiment is configured as a catheter (for example, a central venous catheter, a PICC, a mid-line catheter, and the like) having a longer length than a peripheral venous catheter. Alternatively, the catheter 40 may be the peripheral venous catheter shorter than the central venous catheter. In addition, the catheter 40 is not limited to a venous catheter, and may be configured as an arterial catheter such as a peripheral arterial catheter.

As illustrated in FIGS. 1 and 2, the catheter assembly 10A includes an inner needle 12, a needle hub 20 fixed to a proximal end of the inner needle 12, the catheter 40, and a catheter hub 50 fixed to a proximal end of the catheter 40. Further, the catheter assembly 10A includes a catheter operation member 70 capable of operating forward/backward movement of the catheter 40 and the catheter hub 50 with respect to the inner needle 12, and a safety mechanism 90 covering a needle tip 13 of the inner needle 12 when the inner needle 12 is pulled out from the catheter hub 50.

In the catheter assembly 10A, a multi-structure needle 11 is formed by inserting the inner needle 12 through the catheter 40 in an assembled state (initial state) before use. In the multi-structure needle 11, the needle tip 13 of the inner needle 12 protrudes, and the inner needle 12 and the catheter 40 can be together punctured into the patient. In addition, the needle hub 20 is configured as a housing 21 that accommodates a proximal side of the multi-structure needle 11 inside and also accommodates the catheter hub 50, the catheter operation member 70, and the safety mechanism 90.

In the use of the catheter assembly 10A, a user, such as a doctor and a nurse, grips and operates the housing 21 in the initial state to puncture the multi-structure needle 11 into the patient's body, thereby setting a puncture state in which the needle tip 13 reaches a blood vessel. Further, the user inserts the catheter 40 into the blood vessel by advancing the catheter 40 relative to the inner needle 12 while maintaining the puncture state. Thereafter, the inner needle 12 is retracted and removed from the catheter 40 so that the catheter 40 indwells in the blood vessel. The catheter 40 can perform treatments such as administering a medicinal liquid or blood and sampling blood via a medical device (not illustrated) connected to the catheter hub 50 and a connector 60, which will be described later, in the indwelling state. Hereinafter, each element of the catheter assembly 10A will be described in detail.

The inner needle 12 of the catheter assembly 10A is configured as a hollow tube having rigidity capable of puncturing a skin of a living body, and has the sharp needle tip 13 at a distal end thereof. The needle tip 13 is formed to be slightly flatter than a body portion of the inner needle 12. As a result, the needle tip 13 is prevented from coming out of the safety mechanism 90 that will be described later. Inside the inner needle 12, a hollow portion 14 is provided along the axial direction, and the hollow portion 14 communicates with a distal opening 14a provided at the needle tip 13. As illustrated in FIG. 3A, the inner needle 12 is provided with a hollow portion 14 and a hole 14b penetrating through an outer surface. Incidentally, the inner needle 12 may have a solid structure without including the hollow portion 14, or may include a groove (not illustrated) on an outer circumferential surface instead of the hole 14b.

Examples of a constituent material of the inner needle 12 include a metal material such as stainless steel, aluminum or an aluminum alloy, and titanium or a titanium alloy, a hard resin, ceramics, and the like. The inner needle 12 is firmly fixed to the housing 21 by an appropriate fixing means such as fusion, adhesion, insert molding, or the like.

The housing 21 of the catheter assembly 10A can be handled together with the inner needle 12, and is configured as a gripping member to be gripped during the puncturing of the multi-structure needle 11. The housing 21 is formed in an elongated box shape (bowl shape) having a lower wall 22 and a pair of side walls 23 protruding from both sides of the lower wall 22 as a whole. The housing 21 is designed to have an appropriate size (thickness and length) so as to be easily gripped by the user.

The housing 21 includes an accommodation space 24 extending along the longitudinal direction of the housing 21 formed by the lower wall 22 and the pair of side walls 23. A block-shaped needle holding portion 25, which is connected with and holds the proximal end of the inner needle 12, is provided at a proximal end of the accommodation space 24. The needle holding portion 25 holds the inner needle 12 at a predetermined height in a central portion in the width direction of the housing 21 (the accommodation space 24).

The pair of side walls 23 of the housing 21 extend in parallel with each other along the longitudinal direction with the accommodation space 24 interposed therebetween. Each of the pair of side walls 23 has a distal side formed higher than a proximal side, and includes a groove-shaped rail portion 23a on an inner surface of the distal side. The pair of rail portions 23a slidably accommodate side edges 71a of the catheter operation member 70. The distal side of one of the pair of side walls 23 (the side wall 23 in the left direction in FIG. 1) has a bulge portion 26 that bulges outward in the width direction. A support member 27 (support portion), which supports the catheter 40 when the catheter 40 is moved, is attached to a notched space (an arrangement concave portion 26a) of the bulge portion 26.

The support member 27 is rotatably supported by the side wall 23 and has a sliding-contact support portion 27a that protrudes to the right direction in the accommodation space 24 of the housing 21. The sliding-contact support portion 27a rubs against the catheter 40 when the catheter 40 (the multi-structure needle 11) held by the catheter operation member 70 moves forward. Incidentally, the sliding-contact support portion 27a does not necessarily come into contact with the catheter 40 in the initial state or when the catheter 40 moves relative to the housing 21.

In addition, the support member 27 has a shaft support portion 27b that is pivotally supported by the bulge portion 26, and the shaft support portion 27b has a groove portion (not illustrated) at an upper end portion that accommodates the side edge 71a of the catheter operation member 70 in the initial state. The side edge 71a present in this groove portion restricts rotation, and the support member 27 stands by to be capable of supporting the catheter 40. On the other hand, when the catheter operation member 70 advances, the support member 27 can rotate about the shaft support portion 27b as the side edge 71a comes out of the groove portion, and the sliding-contact support portion 27a faces the outer side of the side wall 23 by coming into contact with the catheter operation member 70. As a result, the catheter hub 50, the catheter operation member 70, and the like are smoothly sent out from the housing 21 while the support member 27 is held by the housing 21.

A constituent material of the housing 21 is not particularly limited, but a thermoplastic resin, such as polypropylene, polycarbonate, polyamide, polysulfone, polyarylate, and a methacrylate-butylene-styrene copolymer may be preferably applied. Although the housing 21 has a configuration in which an upper surface of the accommodation space 24 is open in the illustrated example, the housing 21 may be formed in a polygonal tubular shape in which the accommodation space 24 is covered with an upper wall.

Meanwhile, the catheter 40 of the catheter assembly 10A has an outer shape formed in a perfect circular shape in a cross-sectional view orthogonal to the axial direction. A length of the catheter 40 is not particularly limited, and can be appropriately designed according to the application, various conditions, and the like, and is set to, for example, about 14 to 500 mm.

As illustrated in FIG. 3A, the catheter 40 according to the present embodiment is configured as a multi-lumen type having a plurality of (two in the present embodiment) lumens 41 inside. Specifically, the catheter 40 includes a main lumen 42 through which the inner needle 12 is inserted and arranged in the initial state, and a sub-lumen 43 extending in parallel with the main lumen 42. Each of the main lumen 42 and the sub-lumen 43 is formed in a perfect circular shape in the cross-sectional view orthogonal to the axial direction.

The main lumen 42 is formed over the entire axial length of the catheter 40, and communicates with a distal opening 42a formed at a distal end of the catheter 40 and a first proximal opening 42b (see FIGS. 3A and 3B) formed at a proximal end of the catheter 40. The distal opening 42a exposes the needle tip 13 of the inner needle 12. An inner circumferential surface of the catheter 40 forming the main lumen 42 includes a distal end inner circumferential surface 44a having a narrow gap with the outer circumferential surface of the inner needle 12, a basic inner circumferential surface 44b forming a wider gap than the distal end inner circumferential surface 44a, and a tapered inner circumferential surface 44c extending between the distal end inner circumferential surface 44a and the basic inner circumferential surface 44b.

The distal end inner circumferential surface 44a has a diameter equal to or slightly smaller than an outer diameter of the outer circumferential surface of the inner needle 12, and thus, is in close contact with the outer circumferential surface of the inner needle 12. A diameter of the tapered inner circumferential surface 44c gradually decreases toward the distal end inner circumferential surface 44a in a short range in the axial direction. The basic inner circumferential surface 44b forms most of the inner circumferential surface in the axial direction of the main lumen 42. A diameter of the basic inner circumferential surface 44b is larger than the outer diameter of the outer circumferential surface of the inner needle 12, so that the inner needle 12 slides favorably with respect to the catheter 40. In the initial state, the hole 14b of the inner needle 12 described above opposes the basic inner circumferential surface 44b and communicates with the main lumen 42.

The sub-lumen 43 is axially separated from the main lumen 42 by a partition wall 45 formed inside the catheter 40 along the axial direction. In the present embodiment, an inner circumferential surface of the sub-lumen 43 is set to a diameter smaller than a diameter of the inner circumferential surface (the distal end inner circumferential surface 44a) of the main lumen 42, and extends with a constant diameter along the axial direction of the catheter 40.

The sub-lumen 43 is bent radially outward at an intermediate position on the distal side of the catheter 40 and communicates with a lateral opening 43a formed on an outer circumferential surface (lateral side) of the catheter 40. The lateral opening 43a is provided on the proximal side of the distal opening 42a at a position separated from the distal opening 42a so as to have a predetermined interval. In addition, the proximal side of the sub-lumen 43 communicates with a second proximal opening 43b (see FIGS. 3A and 3B), and the second proximal opening 43b is adjacent to the first proximal opening 42b.

Further, the catheter 40 is constituted by a main body portion 46 that forms most of the axial portion thereof, and a soft tip 47 that is provided at a distal end of the main body portion 46 and is softer than the main body portion 46. The main body portion 46 and the soft tip 47 have connection boundary portions overlapping each other in a tapered shape, so that the physical properties of the catheter 40 gradually change. The inner side of the soft tip 47 forms the distal end inner circumferential surface 44a of the main lumen 42, and a most distal end of the distal end inner circumferential surface 44a forms the distal opening 42a.

A constituent material of the main body portion 46 is not particularly limited, but a transparent soft resin material may be applied. Examples of a constituent material of the main body portion 46 include a fluorine-based resin such as polytetrafluoroethylene (PTFE), an ethylene-tetrafluoroethylene copolymer (ETFE), and a perfluoroalkoxy fluorine resin (PFA), an olefin-based resin such as polyethylene and polypropylene or a mixture thereof, polyurethane, polyester, polyamide, a polyether nylon resin, a mixture of the olefin-based resin and an ethylene-vinyl acetate copolymer, and the like. A constituent material of the soft tip 47 is not particularly limited either, but a resin material, for example, polyurethane or the like may be applied.

As illustrated in FIGS. 1 to 3B, the proximal end of the catheter 40 is fixed to the distal portion in the catheter hub 50 by an appropriate fixing means such as caulking, fusion bonding, and adhesion. The catheter hub 50 is exposed on the patient's skin in a state in which the catheter 40 has been inserted into the patient's blood vessel, and indwells together with the catheter 40 by being pasted with a tape or the like. A material forming the catheter hub 50 is not particularly limited, but, for example, the materials exemplified in the housing 21 may be appropriately adopted.

The catheter hub 50 is formed in a tubular shape tapered in a distal direction. The connector 60 is connected to the catheter hub 50 so as to correspond to the above-described catheter 40 having the multi-lumen structure. That is, a first medical device (a connector of a medical tube, a syringe, or the like) (not illustrated) is connected to the catheter hub 50 to supply a medicinal liquid, and a second medical device (a connector of another medical tube, a syringe, or the like) (not illustrated) is connected to the connector 60. Hereinafter, the catheter hub 50 is also referred to as a main hub 51, and the connector 60 is also referred to as a sub-hub 61. The main hub 51 is a first port configured for inflow of one of two types of medicinal liquids during an infusion, and the sub-hub 61 is a second port configured for inflow of the other of the two types of medicinal liquids.

The main hub 51 fixes the catheter 40 at its distal portion and includes a main space portion 52 on the proximal side of the fixed portion. The main space portion 52 communicates with the main lumen 42 (the first proximal opening 42b) and also communicates with the proximal opening 52a at a proximal end of the main hub 51, and the inner needle 12 is inserted through the main space portion 52 in the initial state. In addition, a sub-flow path 53, which communicates with the sub-lumen 43 (the second proximal opening 43b) of the catheter 40 and also communicates with a sub-space portion 62 in the sub-hub 61, is provided inside the main hub 51. The sub-flow path 53 is curved from the proximal end of the catheter 40 in the main hub 51 and extends toward a side circumferential surface of the main hub 51.

The sub-hub 61 is formed in a tubular shape having the sub-space portion 62 inside, and is connected to the main hub 51 via a relay tube 58. The relay tube 58 is inserted into the distal side of the sub-space portion 62, and the sub-space portion 62 communicates with the proximal opening 62a at a proximal end of the sub-hub 61.

The relay tube 58 has the flexibility that allows the sub-hub 61 to be freely displaced relative to the catheter hub 50. A tube lumen 59 is provided inside the relay tube 58, and the tube lumen 59 causes the sub-flow path 53 to communicate with the sub-space portion 62. The relay tube 58 is fixed to a tube convex portion 54 provided on the main hub 51 (also inserted inside the sub-flow path 53).

The main hub 51 and the sub-hub 61 are formed to mutually have the same shape. Specifically, the main hub 51 and the sub-hub 61 have barrel portions 55a and 63a having substantially constant outer diameters along the axial direction, and tapered portions 55b and 63b that are continuous with distal ends of the barrel portions 55a and 63a and gradually decrease in diameter in the distal direction. One end of the relay tube 58 is connected to the tapered portion 55b of the main hub 51. The other end of the relay tube 58 is inserted from a distal end of the tapered portion 63b of the sub-hub 61 and fixed to the distal side in the sub-hub 61.

In addition, flange portions 55c and 63c, which protrude radially outward and orbit the side circumferential surface, are formed at the proximal ends of the main hub 51 and the sub-hub 61. The flange portions 55c and 63c allow a connector of a medical device of a predetermined standard to be caught. Further, an inner circumferential surface of the main space portion 52 and an inner circumferential surface of the sub-space portion 62 may be formed in luer tapers 51a and 61a so as to be fittable to a medical device having a male connector. Furthermore, a hemostatic valve (not illustrated) preventing back-flow of blood and a plug (not illustrated) or the like that penetrates through the hemostatic valve to allow an infusion along with the insertion of the connector 60 of an infusion tube may be accommodated in the main space portion 52 of the main hub 51 and the sub-space portion 62 of the sub-hub 61.

The catheter 40 and the catheter hub 50 described above are accommodated in the accommodation space 24 of the housing 21 in the initial state, and are operated to move by the catheter operation member 70 accommodated so as to cover an upper surface of the accommodation space 24. In particular, both the main hub 51 and the sub-hub 61 are accommodated in the housing 21 and the catheter operation member 70 in the catheter assembly 10A according to the present embodiment, and thus, can be operated togehter.

Specifically, the catheter operation member 70 includes an operation plate portion 71 extending in the longitudinal direction of the housing 21 and a hub storage portion 72 that is continuous with a proximal end of the operation plate portion 71 and stores the catheter hub 50.

The operation plate portion 71 is a site in contact with a user's finger to perform an advancing/retracting operation. The pair of side edges 71a of the operation plate portion 71 are initially arranged on the pair of rail portions 23a of the housing 21 and upper surfaces of the pair of side walls 23. In addition, on a lower surface of the operation plate portion 71, one or more catheter holding portions 73, formed of a pair of protrusions, are provided along the longitudinal direction, and bite the catheter 40 at each spot (see also FIG. 4A). That is, the multi-structure needle 11 (the catheter 40) is supported at an intermediate position in the axial direction by the support member 27 and the operation plate portion 71 described above. In addition, a plurality of ribs 74 and a plurality of operation tabs 75 are provided on an upper surface of the operation plate portion 71.

The hub storage portion 72 has an upper portion 76 and a pair of side portions 77, which are connected to both sides of the upper portion 76 in the width direction and extend downward, and is formed in a box shape that is long along the longitudinal direction of the catheter operation member 70. An internal space 78 accommodating the main hub 51 and the sub-hub 61 is formed on the inner side of the upper portion 76 and the pair of side portions 77. The internal space 78 is open to a lower surface and a proximal end of the hub storage portion 72.

The upper portion 76 of the hub storage portion 72 is formed in a flat shape in the illustrated example, but may be configured in various shapes capable of accommodating the main hub 51 and the sub-hub 61. For example, the upper portion 76 may be formed in a dome shape. In addition, the distal side of each of the pair of side portions 77 is formed in an inclined portion 77a that gradually narrows in the distal direction. The distal end of the hub storage portion 72 formed between the pair of inclined portions 77a is formed with an opening (not illustrated) that allows the multi-structure needle 11 (the catheter 40) to extend from the internal space 78.

Here, in the hub storage portion 72 according to the present embodiment, the main hub 51 and the sub-hub 61 are arranged so as to be shifted in the longitudinal direction (the extending direction of the inner needle 12), and further, an axis of the sub-hub 61 is shifted radially outward (in the width direction) with respect to an axis of the main hub 51. Specifically, the main hub 51 is arranged at a central portion in the width direction of the hub storage portion 72. As a result, the main hub 51 is located at the central portion in the width direction with respect to the housing 21, and the inner needle 12 is inserted to extend in a straight line through the main space portion 52 and the main lumen 42.

Meanwhile, the sub-hub 61 is located on the proximal side of the main hub 51 and is arranged next to the inner needle 12. That is, the sub-hub 61 is arranged between the side wall 23 of the housing 21 and the inner needle 12, and moves in sliding-contact with the inner needle 12 when moving. Although the sub-hub 61 is arranged on the proximal side of the entire main hub 51 in the hub storage portion 72 in FIG. 1, the proximal side of the main hub 51 and the distal side (the tapered portion 63b) of the sub-hub 61 may be arranged so as to overlap each other in the width direction.

In addition, the relay tube 58 is accommodated in an appropriate mode in a gap in the lateral direction of the main hub 51 on the distal side of the sub-hub 61 in the internal space 78 of the hub storage portion 72. For example, the relay tube 58 is folded a plurality of times to be put together such that the tube lumen 59 is not crushed or kinked. A tube locking portion (not illustrated) that locks the relay tube 58 with a weak force may be provided on an inner surface of the hub storage portion 72.

That is, in the initial state, the catheter assembly 10A forms a restriction portion 100A that restricts the free displacement of the sub-hub 61 by the hub storage portion 72 of the catheter operation member 70. In the present embodiment, the housing 21 also covers the lower side of the sub-hub 61 in the initial state, and thus, forms a part of the restriction portion 100A.

The catheter operation member 70 moves the main hub 51 and the sub-hub 61 together along with the movement in the distal direction or the proximal direction with respect to the housing 21. Thus, a locking portion 79 is provided on the inner side of the hub storage portion 72. In the present embodiment, the locking portion 79 includes a first locking portion 79a that locks the main hub 51 and a second locking portion 79b that locks the sub-hub 61.

A configuration of the first locking portion 79a is not particularly limited, and an appropriate spot may be locked according to an outer shape of the main hub 51. For example, the first locking portion 79a can be constituted by a pair of pieces that suitably lock the tapered portion 55b of the main hub 51, a piece that presses the proximal end of the main hub 51, and the like. Similarly, a configuration of the second locking portion 79b is not particularly limited either, but an appropriate spot may be locked according to an outer shape of the sub-hub 61. In addition, the hub storage portion 72 opens the proximal side of the internal space 78, and is connected with the safety mechanism 90 in a detachable manner.

The safety mechanism 90 according to the present embodiment is formed in a cylindrical shape having a cavity 90a inside, and penetrates through the inner needle 12 in the initial state. Further, the safety mechanism 90 accommodates the needle tip 13, having moved along with withdrawal of the inner needle 12 from the catheter 40, inside to prevent the needle tip 13 from being exposed again. As illustrated in FIG. 2, in the safety mechanism 90, a shutter member 91 and a retaining member 92 are accommodated at predetermined positions of the cavity 90a. The shutter member 91 is elastically deformed in contact with the outer circumferential surface of the inner needle 12 in a penetrating arrangement state of the inner needle 12, and is elastically restored when the needle tip 13 comes out to block a penetrating path of the inner needle 12. The retaining member 92 has a hole having a smaller diameter than the needle tip 13 of the inner needle 12 to regulate the needle tip 13 from coming out in the proximal direction.

In addition, the safety mechanism 90 has a pair of claw portions 93 protruding in the distal direction. In the initial state, the pair of claw portions 93 are engaged with the catheter operation member 70. For example, the hub storage portion 72 has inner convex portions (not illustrated) on the inner surfaces of the pair of side portions 77 forming the internal space 78, and the pair of claw portions 93 are caught by the inner convex portions. As a result, the safety mechanism 90 can move together with the catheter operation member 70.

Incidentally, the proximal side of each of the pair of side portions 77 forming the hub storage portion 72 may be configured as a piece (not illustrated) that is set to a free state in the state of being exposed from the housing 21. The pair of pieces are arranged in parallel with each other to engage with the safety mechanism 90 in the state of being accommodated in the housing 21, and facilitate disengagement of the safety mechanism 90 in the exposed state.

The catheter assembly 10A according to the present embodiment is basically configured as described above, and operations thereof will be described hereinafter.

As described above, the catheter assembly 10A is used at the time of forming the inlet/outlet for the infusion, the blood transfusion, the blood sampling, and the like to the patient. The user grips and operates the housing 21 of the catheter assembly 10A in the initial state to puncture the patient with the multi-structure needle 11. At this time, the catheter assembly 10A accommodates the relay tube 58 and the sub-hub 61 connected to the main hub 51 on the inner side of the housing 21 and the catheter operation member 70. That is, the free displacement of the sub-hub 61 with respect to the main hub 51 is restricted in the initial state, and thus, the user can favorably grip the housing 21 and easily perform the subsequent operations without being affected by the sub-hub 61.

When the multi-structure needle 11 is punctured, the support member 27 of the housing 21 supports the catheter 40 and favorably secures the linearity of the catheter 40. When the catheter 40 is inserted, the distal end inner circumferential surface 44a including the soft tip 47 is in close-contact with the inner needle 12, and thus, is not bent radially inward, which allows the catheter 40 to be easily inserted into the body.

When the needle tip 13 of the inner needle 12 reaches the blood vessel, the blood, which has flowed into the hollow portion 14 from the distal opening 14a of the inner needle 12, flows to the main lumen 42 of the catheter 40 through the hole 14b. As a result, the user can visually recognize a flashback of blood and confirm that the main lumen 42 has secured the blood vessel.

Figure 4A:
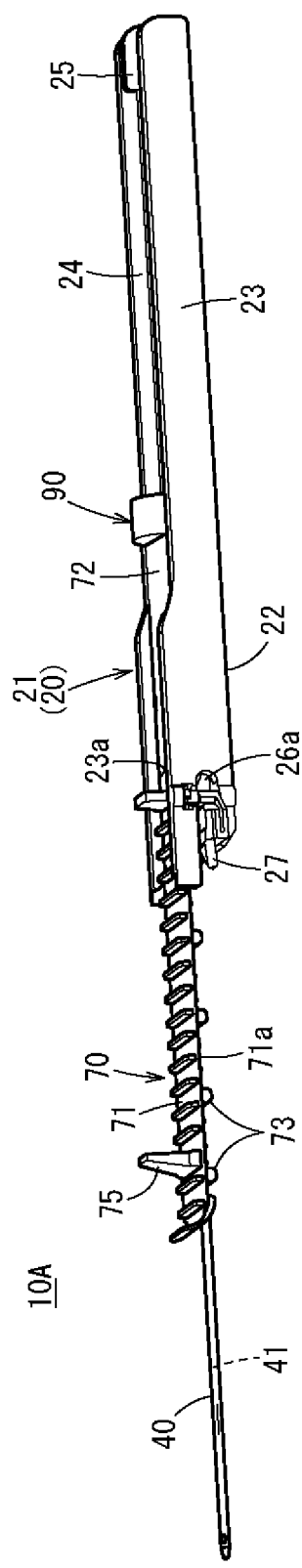
FIG. 4A is a first explanatory view illustrating an operation of the catheter assembly during use.

In this puncture state, the user advances the catheter operation member 70 to advance the catheter 40 relative to the inner needle 12 as illustrated in FIG. 4A. At this time, the catheter operation member 70 advances the main hub 51 and the sub-hub 61 accommodated in the hub storage portion 72 in a dependent manner, and also moves the safety mechanism 90. In the catheter assembly 10A, the lower side of the catheter 40 is supported by the support member 27 when the catheter 40 is advanced, so that the deflection of the catheter 40 can be suppressed.

Although the operation plate portion 71 of the catheter operation member 70 is illustrated in the state of extending in the flat shape in FIG. 4A, the operation plate portion 71 is bent due to a user's gripping state or contact with the patient's skin when advancing. At this time, the catheter holding portions 73 aligned on the lower surface side of the operation plate portion 71 release the holding of the catheter 40. At the stage of inserting the catheter 40 into the blood vessel to some extent, blood flows into the sub-lumen 43 from the lateral opening 43a. As a result, the user can favorably recognize that the sub-lumen 43 has secured the blood vessel.

Figure 4B:
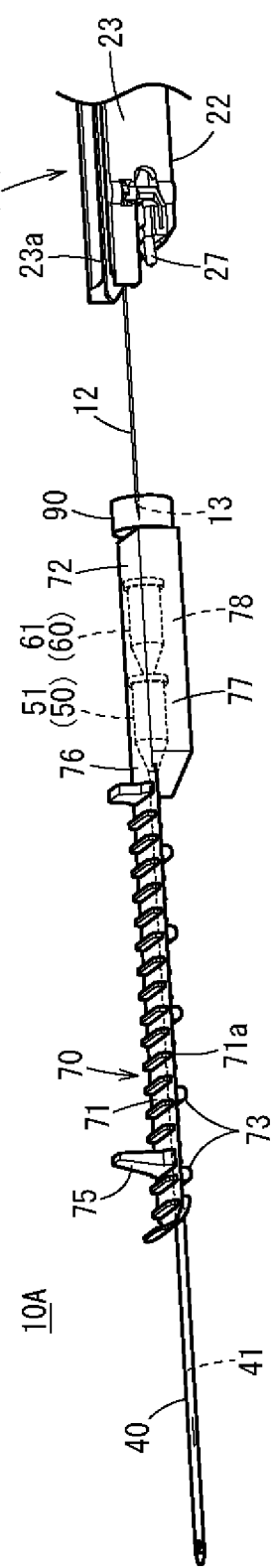
FIG. 4B is a second explanatory view illustrating the operation of the catheter assembly during use.

When the catheter operation member 70 is advanced to some extent relative to the housing 21, the distal end of the hub storage portion 72 comes into contact with the support member 27 and rotates the support member 27 outward. As a result, the hub storage portion 72 can be sent to the distal side of the housing 21. When the catheter operation member 70 is further advanced, the hub storage portion 72 storing the main hub 51 and the sub-hub 61 and the safety mechanism 90 are exposed to the outside of the housing 21 as illustrated in FIG. 4B.

When the safety mechanism 90 moves up to the needle tip 13 of the inner needle 12, the exposure of the needle tip 13 is blocked and the safety mechanism 90 is prevented from being withdrawn from the inner needle 12 by the action of the shutter member 91 and the retaining member 92 described above. That is, the safety mechanism 90 engages with the inner needle 12 and the housing 21, and the catching of the claw portion 93 is released as illustrated in FIG. 5A so that the catheter operation member 70 is separated from the safety mechanism 90.

In the state in which the inner needle 12 is withdrawn from the main hub 51 as illustrated in FIG. 5B, the main hub 51 and the sub-hub 61 can be taken out from below (an open portion of the internal space 78) the hub storage portion 72 of the catheter operation member 70. As described above, the first and second locking portions 79a and 79b of the hub storage portion 72 loosely lock the main hub 51 and the sub-hub 61, and thus, the catheter 40, the main hub 51, and the sub-hub 61 can be easily separated by, for example, pulling the catheter operation member 70 upward relative to the catheter 40.

When the catheter 40 remains indwelled, medical devices that are to be connected are connected to the main hub 51 and the sub-hub 61, respectively. As a result, the catheter 40 administers a first medicinal liquid to the patient via the main space portion 52 and the main lumen 42, and administers a second medicinal liquid to the patient via the sub-space portion 62, the tube lumen 59, the sub-flow path 53, and the sub-lumen 43.

Incidentally, the present invention is not limited to the above-described embodiment, and various modifications can be made in accordance with a gist of the invention. For example, the catheter assembly 10A may be configured without the safety mechanism 90, or other mechanisms that assist an insertion operation of the catheter 40 may be applied in addition to the above-described configuration. Other mechanisms include a guide wire that assists the insertion of the catheter 40 and a guide wire operation member that controls the advancement and retraction of the guide wire.

Alternatively, the safety mechanism 90 is not limited to the above-described configuration, and various mechanisms capable of preventing erroneous puncture of the inner needle 12 can be adopted. For example, the catheter assembly 10A be configured such that a blunt needle (bar member) is accommodated in the hollow portion 14 of the inner needle 12 and the blunt needle is exposed along with the advancement of the catheter 40. In addition, the catheter assembly 10A may be configured such that a plurality of telescope-type cylinders are extended along with the advancement of the catheter 40 to accommodate the entire inner needle 12.

In addition, the catheter 40 has the two lumens 41 in the above-described embodiment, but the catheter 40 may have one or three or more lumens 41 in the present invention. This is because it is possible to adopt a configuration in which the connector 60 is connected to the catheter hub 50 to cause a medicinal liquid to flow from the connector 60 to the lumen 41 of the catheter 40 even in the configuration in which the catheter 40 has the single lumen 41. Even in this configuration, the free displacement of the connector 60 with respect to the catheter 40 can be restricted to significantly improve the usability by applying the restriction portion 100A.

Figure 6A:
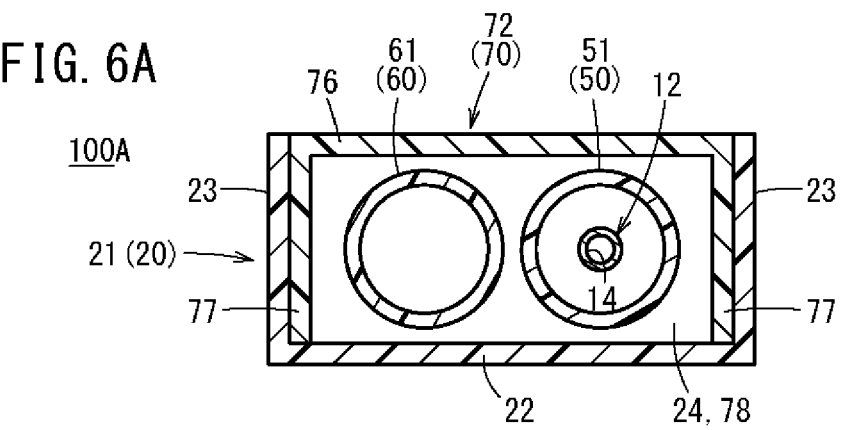
FIG. 6A is a cross-sectional view schematically illustrating a first configuration example of a restriction portion.

Further, the arrangement of the main hub 51 and the sub-hub 61 accommodated inside the housing 21 and the catheter operation member 70 may be freely set in the catheter assembly 10A. For example, as in a first configuration example illustrated in FIG. 6A, the main hub 51 and the sub-hub 61 may be arranged so as to be aligned in the width direction inside the housing 21 and the catheter operation member 70. Even if the main hub 51 and the sub-hub 61 are aligned in the width direction in this manner, the housing 21 and the catheter operation member 70 can have a dimension that is short in the up-down direction. Thus, the user can smoothly perform puncturing with the multi-structure needle 11 and the insertion operation of the catheter 40 by holding the lower wall 22 of the housing 21 and the upper portion 76 of the catheter operation member 70 so as to be interposed between the fingers.

Figure 6B:
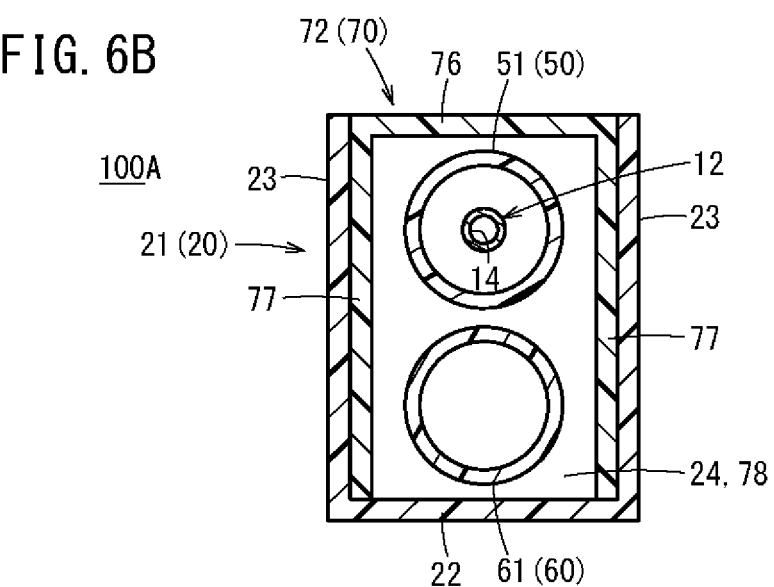
FIG. 6B is a cross-sectional view schematically illustrating a second configuration example of the restriction portion.

In addition, as in a second configuration example illustrated in FIG. 6B, the main hub 51 and the sub-hub 61 may be arranged so as to be aligned in the vertical direction (up and down) inside the housing 21 and the catheter operation member 70. In FIG. 6B, the main hub 51 is arranged on the upper side and the sub-hub 61 is arranged on the lower side. When the main hub 51 and the sub-hub 61 are aligned in the vertical direction in this manner, the housing 21 can have a dimension that is short in the vertical direction. Therefore, the user can smoothly perform the puncturing with the multi-structure needle 11 and the insertion of the catheter 40 by holding the pair of side walls 23 of the housing 21 so as to be interposed between the fingers.

Figure 6C:
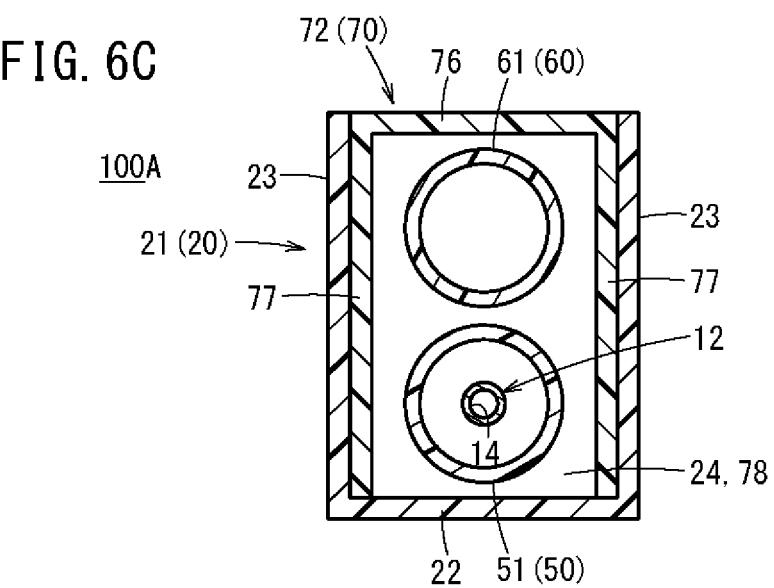
FIG. 6C is a cross-sectional view schematically illustrating a third configuration example of the restriction portion.

Further, as in a third configuration example illustrated in FIG. 6C, the main hub 51 may be arranged on the lower side and the sub-hub 61 may be arranged on the upper side. As a result, the inner needle 12 extends so as to approach the lower wall 22 of the housing 21, and thus, it is easy to perform puncturing at a shallower angle when the patient is punctured with the multi-structure needle 11.

First Modification

Figure 7A:
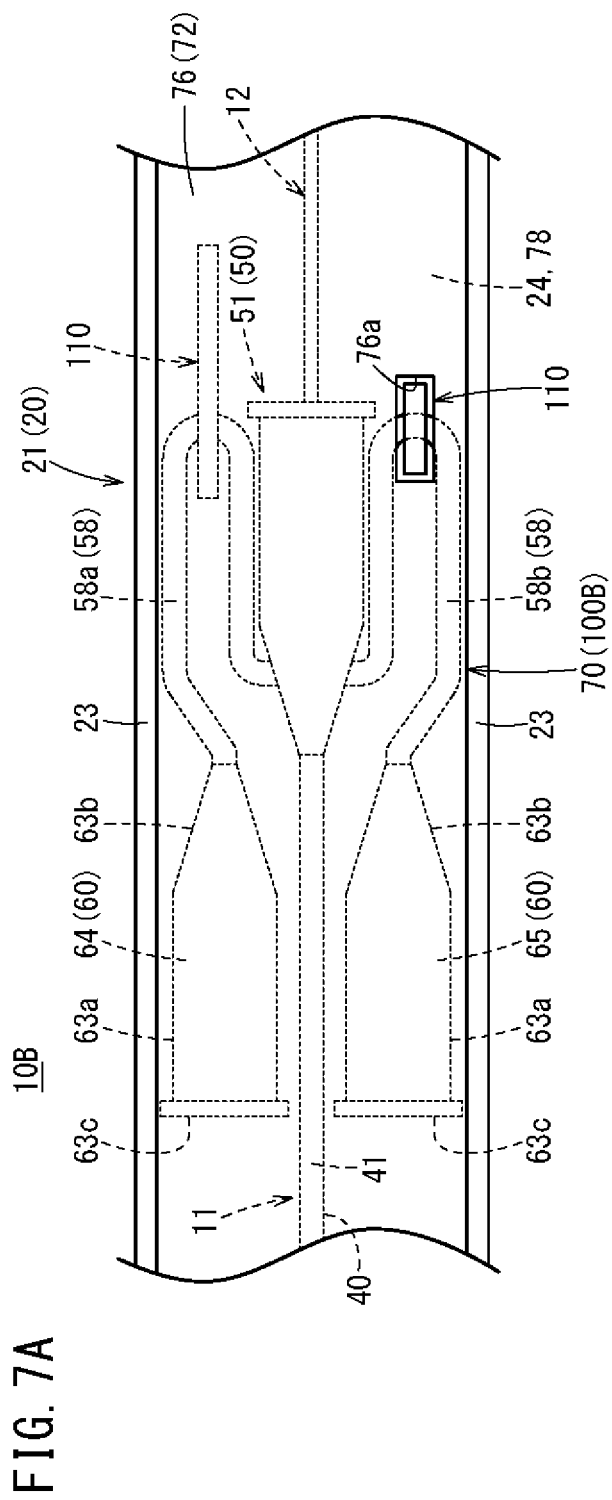
FIG. 7A is a partial plan view of a catheter assembly according to a first modification.

As illustrated in FIG. 7A, a catheter assembly 10B according to a first modification is different from the above-described catheter assembly 10A in that two connectors 60 (a first sub-hub 64 and a second sub-hub 65) are connected to the catheter hub 50 (main hub 51). Incidentally, an element having the same configuration or the same function as that described above will be denoted by the same reference sign, and the detailed description thereof will be omitted in the following description.

In this case, the catheter 40 can be configured in a structure having three lumens 41 communicating with the catheter hub 50, the first sub-hub 64, the second sub-hub 65, respectively. Alternatively, the catheter 40 may have two lumens 41 such that one lumen 41 communicates with the first sub-hub 64 and the other lumen 41 communicates with the second sub-hub 65. The first sub-hub 64 is connected to the main hub 51 via a first relay tube 58a, and the second sub-hub 65 is connected to the main hub 51 via a second relay tube 58b.

The housing 21 and the catheter operation member 70 are configured in the same manner as those in the above-described catheter assembly 10A, and the main hub 51, and the first and second sub-hubs 64 and 65 are stored in the hub storage portion 72 of the catheter operation member 70. That is, the hub storage portion 72 of the catheter operation member 70 (and the housing 21) functions as a restriction portion 100B that restricts the free displacement of the first and second sub-hubs 64 and 65.

For example, the main hub 51 is arranged at a center position in the width direction of the hub storage portion 72, holds the proximal end of the catheter 40, and the inner needle 12 penetrates the inside of the main hub 51. The first and second sub-hubs 64 and 65 are arranged on the distal side of the main hub 51 such that a taper direction of the tapered portion 63b faces the proximal direction with respect to the main hub 51. With such an arrangement, dimensions of the housing 21 and the catheter operation member 70 in the width direction can be made as small as possible. Although not illustrated, the hub storage portion 72 has locking portions 79 locking the main hub 51, and the first and second sub-hubs 64 and 65, respectively (or together).

Figure 7B:
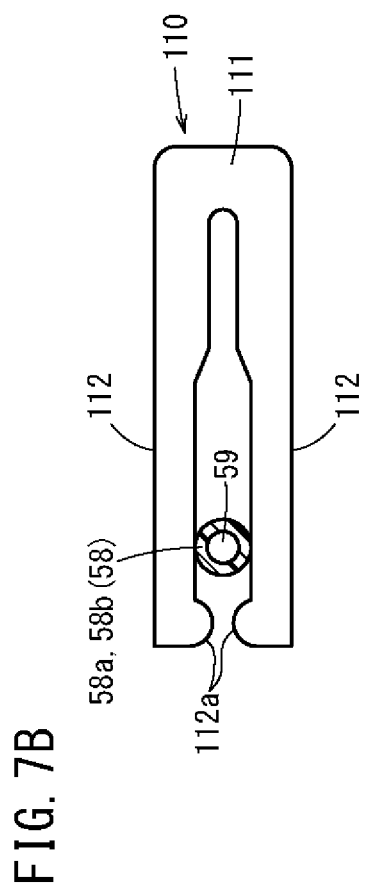
FIG. 7B is an explanatory view illustrating a clamp of FIG. 7A.

In addition, clamps 110 are attached in advance to the first and second relay tubes 58a and 58b, respectively. As illustrated in FIG. 7B, the clamp 110 has a base 111 and a pair of arms 112 extending from the base 111. The pair of arms 112 are formed to be thick on the base 111 side and thin on an extending end side, and have a retaining convex portion 112a protruding inward at the extending end. That is, the clamps 110 are configured to be capable of transitioning between a non-closing state of being engaged so as not to close the first and second relay tubes 58a and 58b on the extending end side, and a closing state of being engaged so as to close the tube lumen 59 on the base 111 side.

The hub storage portion 72 can be configured to accommodate the clamp 110 inside as illustrated in the state of being connected with the first relay tube 58a in FIG. 7A. Alternatively, the hub storage portion 72 may be configured such that a part of the clamp 110 protrudes from a window 76a provided on the upper portion 76 as illustrated in the state of being connected with the second relay tube 58b in FIG. 7A.

As described above, the restriction portion 100B in which the main hub 51 and the first and second sub-hubs 64 and 65 are arranged inside the catheter operation member 70 is also configured in the catheter assembly 10B according to the first modification. As a result, the free displacement of the first and second sub-hubs 64 and 65 is restricted, and the handleability of the catheter assembly 10B can be improved.

Second Modification

Figure 8:
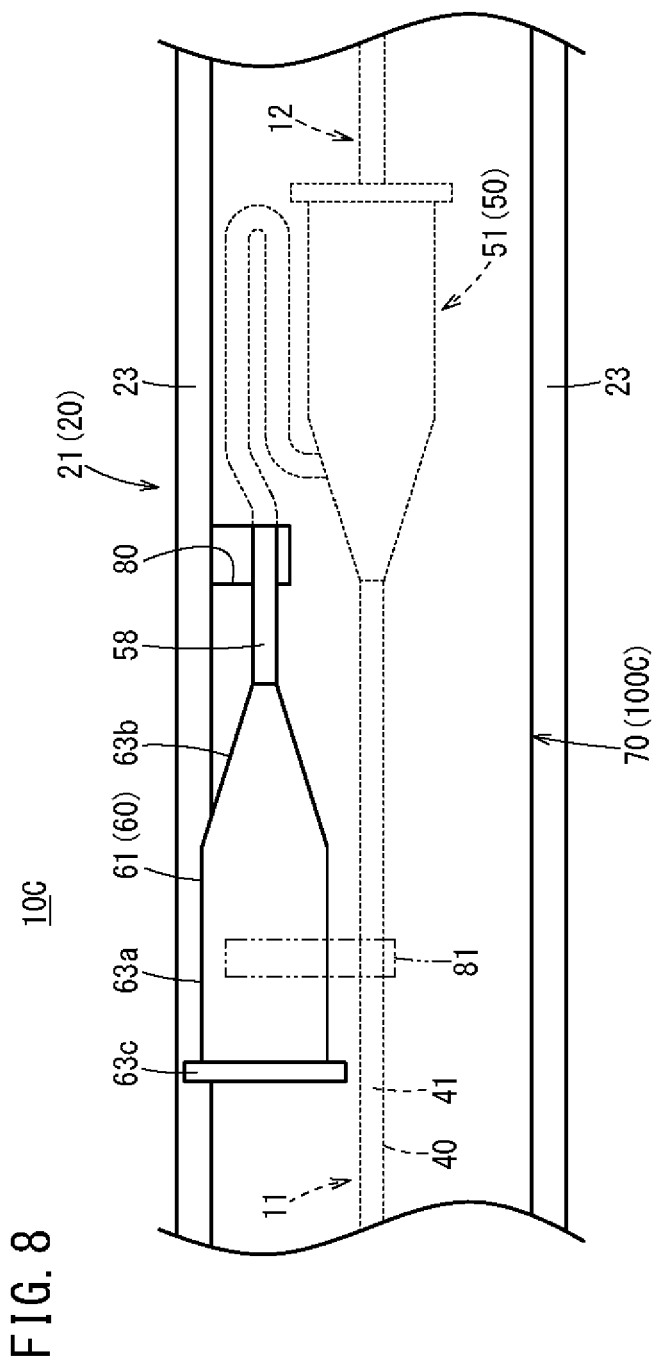
FIG. 8 is a partial plan view of a catheter assembly according to a second modification.

As illustrated in FIG. 8, a catheter assembly 10C according to a second modification is different from the above-described catheter assemblies 10A and 10B in that the sub-hub 61 connected to the main hub 51 is exposed from the catheter operation member 70. That is, the catheter operation member 70 is configured such that a notch 80 continuous in a series in the upper portion 76 and the side portion 77 is provided and the relay tube 58 connecting the main hub 51 and the sub-hub 61 passes through the notch 80. Most of the relay tube 58 is stored in the hub storage portion 72, and a portion exposed from the hub storage portion 72 is a short range (for example, equal to or less than 20% of the total length of the relay tube 58).

The inner needle 12 is inserted through the main hub 51 in a central portion of the hub storage portion 72 in the width direction. The sub-hub 61 is exposed to the upper portion 76 of the catheter operation member 70, and is located to be slightly shifted in the width direction with respect to the main hub 51. In addition, in the sub-hub 61, the taper direction of the tapered portion 63b faces the proximal direction at a position near the notch 80.

Although the catheter assembly 10C is configured to expose a part of the relay tube 58 and the sub-hub 61 through the notch 80 in this manner, the relay tube 58 is caught by the catheter operation member 70 around the notch 80 so that the free displacement of the sub-hub 61 with respect to the main hub 51 is restricted. That is, the catheter operation member 70 functions as a restriction portion 100C of the present invention.

Incidentally, the catheter assembly 10C may include a locking portion 81 (see the alternate long and short dash line in FIG. 8) that appropriately locks the sub-hub 61 exposed on the upper portion 76 of the catheter operation member 70. As a result, the swing of the sub-hub 61 can be suppressed more reliably. In addition, the catheter assembly 10C according to the second modification may also have a plurality of the sub-hubs 61 and relay tubes 58 connected to the sub-hubs 61, respectively, similarly to the first modification. Even in this case, a part of each of the relay tubes 58 and each of the sub-hubs 61 can be exposed by providing a plurality of the notches 80.

Third Modification

Figure 9:
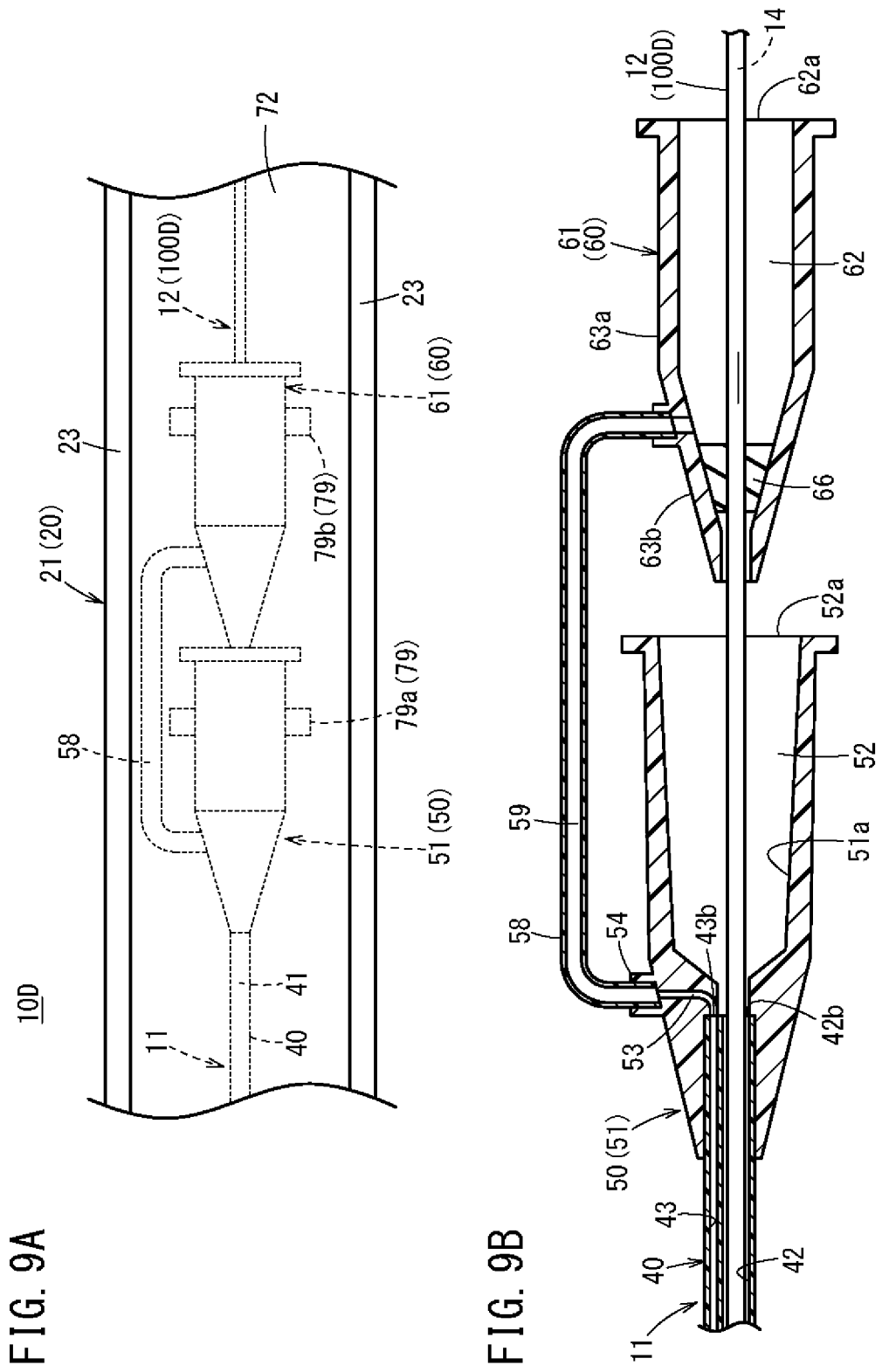
FIG. 9A is a partial plan view of a catheter assembly according to a third modification.
FIG. 9B is a plan cross-sectional view of a catheter hub and a connector of FIG. 9A.

As illustrated in FIGS. 9A and 9B, a catheter assembly 10D according to a third modification is different from the above-described catheter assemblies 10A to 10C in that the inner needle 12 is inserted through both the main hub 51 and the sub-hub 61. That is, in an initial state, the main hub 51 and the sub-hub 61 are accommodated in the hub storage portion 72 of the catheter operation member 70 in a state of being aligned along the axial direction of the inner needle 12.

In this case, the main hub 51 can adopt the similar configuration as the above-described catheter assembly 10A (in which the relay tube 58 is connected to a side surface of the tapered portion 55b and the sub-flow path 53 and the tube lumen 59 communicate with each other). On the other hand, in the sub-hub 61, the relay tube 58 is connected to a side surface of the tapered portion 63b, and a hole that causes the tube lumen 59 to communicate with the sub-space portion 62 is formed on this side surface. In addition, the sub-hub 61 has a valve body 66, which allows the inner needle 12 to be inserted through and is closed when the inner needle 12 is removed, on the distal side of the sub-space portion 62. The valve body 66 closes the sub-space portion 62 in a state in which a medical device is connected to the sub-hub 61 (the state in which the inner needle 12 is removed), thereby causing a medicinal liquid to flow favorably through the tube lumen 59.

The hub storage portion 72 of the catheter operation member 70 includes the first locking portion 79a locking a side circumferential surface of the main hub 51 and the second locking portion 79b locking a side circumferential surface of the sub-hub 61. As a result, the main hub 51 and the sub-hub 61 can be moved based on an operation of the catheter operation member 70 by a user.

The above-described catheter assembly 10D functions as a restriction portion 100D in which the inner needle 12 inserting through the inside of the sub-hub 61 restricts the free displacement of the sub-hub 61. In addition, the catheter operation member 70 also constitutes a part of the restriction portion 100D by storing the relay tube 58 so that it is possible to prevent the relay tube 58 from becoming an obstacle during a puncturing operation of the multi-structure needle 11 and an insertion operation of the catheter 40.

Fourth Modification

Figure 10:
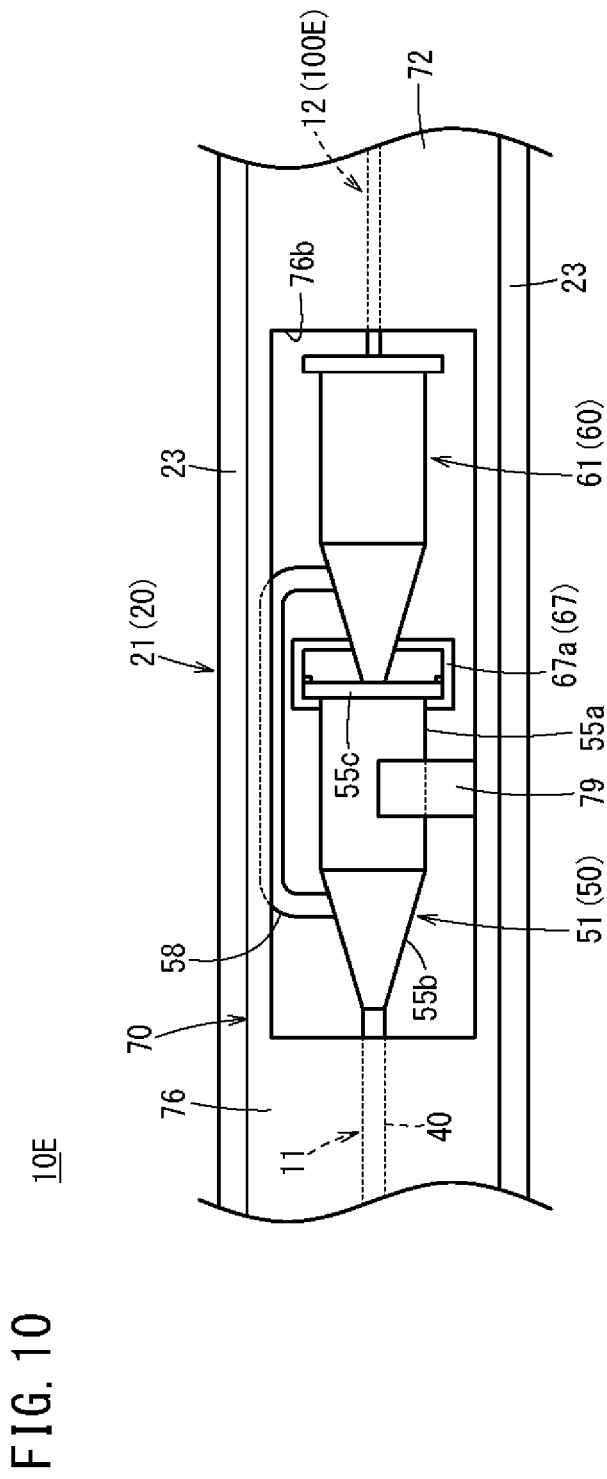
FIG. 10 is a partial plan view of a catheter assembly according to a fourth modification.

As illustrated in FIG. 10, a catheter assembly 10E according to a fourth modification is different from the above-described catheter assemblies 10A to 10D in that a connection mechanism 67 connected with the main hub 51 is provided while allowing the inner needle 12 to be inserted through the main hub 51 and the sub-hub 61 similarly to the third modification. In addition, the upper portion 76 of the catheter operation member 70 (the hub storage portion 72) is provided with an upper opening portion 76b that exposes the main hub 51 and the sub-hub 61.

In this case, the connection mechanism 67 is constituted by a plurality of connection arms 67a fixed to the sub-hub 61. The plurality of connection arms 67a are provided on the distal side of a spot where the relay tube 58 is connected. Each of the connection arms 67a protrudes outward in the radial direction of the sub-hub 61, bends at an intermediate position, and extends in the distal direction. An inner claw portion, which is caught by the flange portion 55c of the main hub 51, is provided at an extending end of each of the connection arms 67a in the distal direction. As a result, the sub-hub 61 can move favorably in conjunction with the advancing movement of the main hub 51.

The catheter operation member 70 has the locking portion 79 that locks the side circumferential surface of the main hub 51 with an appropriate locking force. As a result, the main hub 51 exposed from the upper opening portion 76b can rotate relative to the inner needle 12 under the user's operation. Here, the inner needle 12 and the catheter 40 are sometimes stuck to each other due to long-term storage or the like in the catheter assembly 10E, but the user can eliminate this sticking by rotating the main hub 51 before puncturing.

As described above, the inner needle 12 also functions as a restriction portion 100E in the catheter assembly 10E according to the fourth modification. The catheter operation member 70 can move the sub-hub 61 through the connection arm 67a in a dependent manner by moving the main hub 51 under the user's operation.

Fifth Modification

As illustrated in FIG. 11A, a catheter assembly 10F according to a fifth modification is different from the above-described catheter assemblies 10A to 10E in that the first sub-hub 64 and the second sub-hub 65 are arranged side by side on the proximal side of the main hub 51 and the inner needle 12 is inserted through the inside of each of the hubs. In this case, the first sub-hub 64 is connected to the main hub 51 by the connection arm 67a, and the second sub-hub 65 is connected to the first sub-hub 64 by the connection arm 67a. In addition, the safety mechanism 90 of the catheter assembly 10F also has a connection arm 94 similar to the connection arm 67a instead of the claw portion 93, and is connected to the second sub-hub 65.

In this manner, the inner needle 12 also functions as a restriction portion 100F by aligning the main hub 51, the first sub-hub 64, and the second sub-hub 65 in the axial direction and inserting the inner needle 12. In addition, the catheter operation member 70 can move the other hubs in a dependent manner by advancing one of the hubs (for example, the main hub 51).

Sixth Modification

As illustrated in FIG. 11B, a catheter assembly 10G according to a sixth modification is different from the above-described catheter assemblies 10A to 10F in that the safety mechanism 90 is arranged on the proximal side of the sub-hub 61 and the connection arm 94 of the safety mechanism 90 is caught by the main hub 51. The inner needle 12 functions as a restriction portion 100G of the present invention by penetrating through the main hub 51, the sub-hub 61, and the safety mechanism 90. Even if the safety mechanism 90 is connected to the main hub 51 in this manner, the main hub 51 follows the safety mechanism 90 along with the operation of the catheter operation member 70, and thus, the safety mechanism 90 can push the sub-hub 61 to move the sub-hub 61.

Seventh Modification

As illustrated in FIG. 11C, a catheter assembly 10H according to a seventh modification is different from the catheter assemblies 10A to 10G in that the distal end of the sub-hub 61 is inserted inside the main hub 51 to fit the both to each other. That is, the inner circumferential surface of the main hub 51 forming the main space portion 52 is formed as the luer taper 51a, and the tapered portion 63b of the sub-hub 61 can be fitted to the luer taper 51a. In this catheter assembly 10H, the main hub 51 functions as a restriction portion 100H together with the inner needle 12. Then, the main hub 51 and the sub-hub 61 can be moved together along with the operation of the catheter operation member 70.

Eighth Modification

Figure 12:
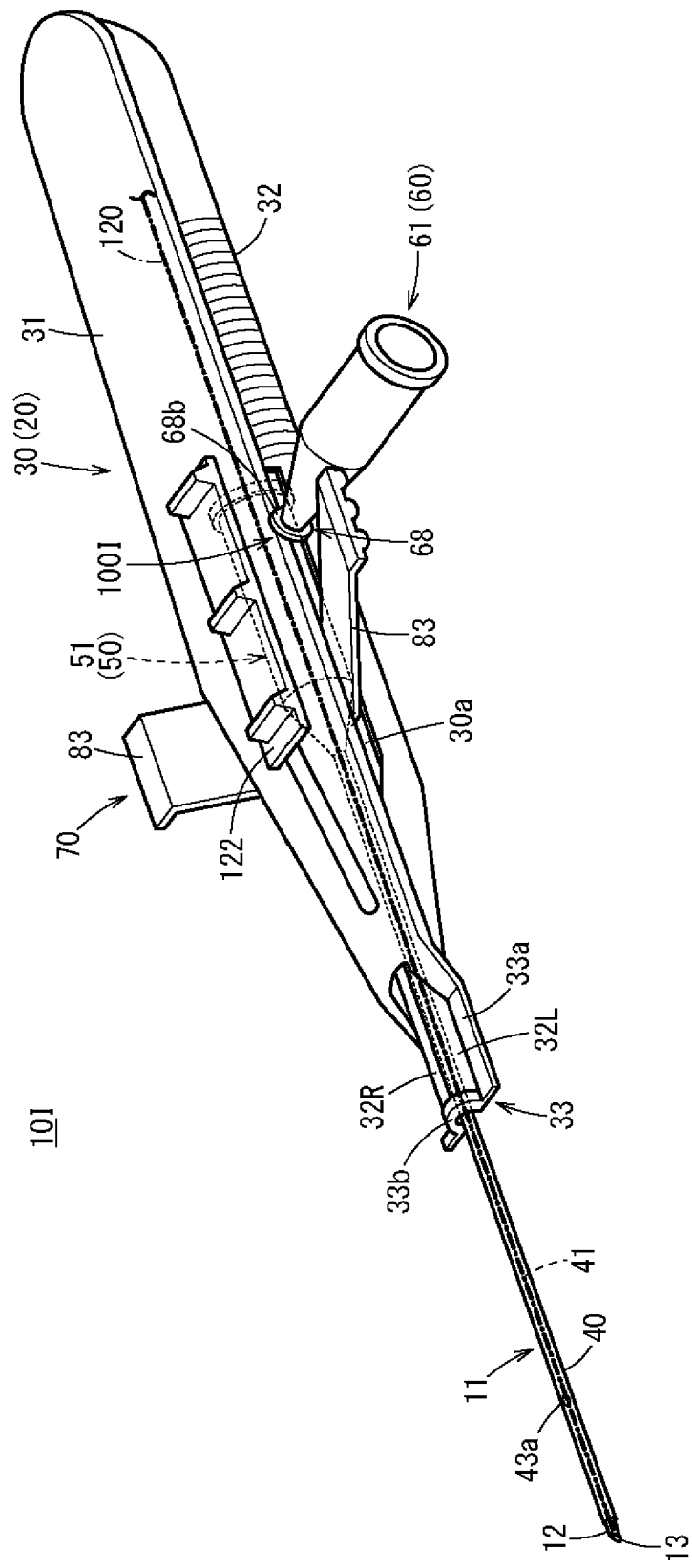
FIG. 12 is a perspective view of a catheter assembly according to an eighth modification.

As illustrated in FIG. 12, a catheter assembly 10I according to an eighth modification is different from the above-described catheter assemblies 10A to 10H in that the housing 30 (the needle hub 20) can be vertically separated and the main hub 51 is extended to the proximal side of the catheter operation member 70. Incidentally, the catheter 40 has one or two lumens 41 (the main lumen 42 and the sub-lumen 43) and forms the multi-structure needle 11 together with the inner needle 12 in an initial state, which is similar to the above-described catheter assembly 10A.

Specifically, the housing 30 has an upper housing 31 and a lower housing 32, and distal portions thereof are mutually closed in the initial state. A slit 30a is formed between the upper housing 31 and the lower housing 32 along the longitudinal direction of the housing 30. In addition, the distal portion of the lower housing 32 can be divided into a right distal portion 32R and a left distal portion 32L, and is configured to expand in the left-right direction.

The distal portion of the upper housing 31 has a regulating portion 33 that regulates the right distal portion 32R and the left distal portion 32L from being open in the left-right direction in the initial state. The regulating portion 33 is configured to hold both the left and right sides of the right distal portion 32R and the left distal portion 32L by a pair of plate portions 33a and connect the upper sides of the pair of plate portions 33a by a bridge portion 33b.

Holding grooves (not illustrated) are formed in the right distal portion 32R and the left distal portion 32L, respectively. The right distal portion 32R and the left distal portion 32L, which form the two holding grooves, form a hole-shaped support portion that rubs against the catheter 40 as the catheter 40 moves forward with respect to the inner needle 12. In the initial state of the catheter assembly 10I, a slight gap is formed between an outer surface of the catheter 40 and an inner surface of the support portion.

Figure 13:
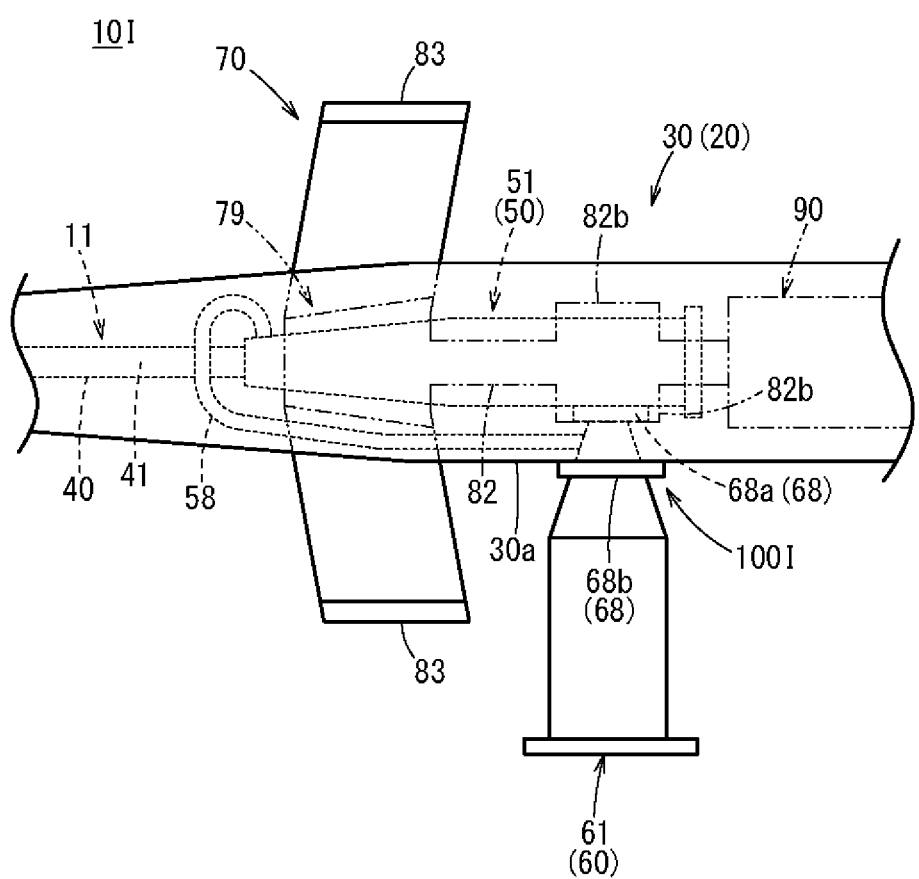
FIG. 13 is a partial plan view of the catheter assembly of FIG. 12.
Figure 14A:
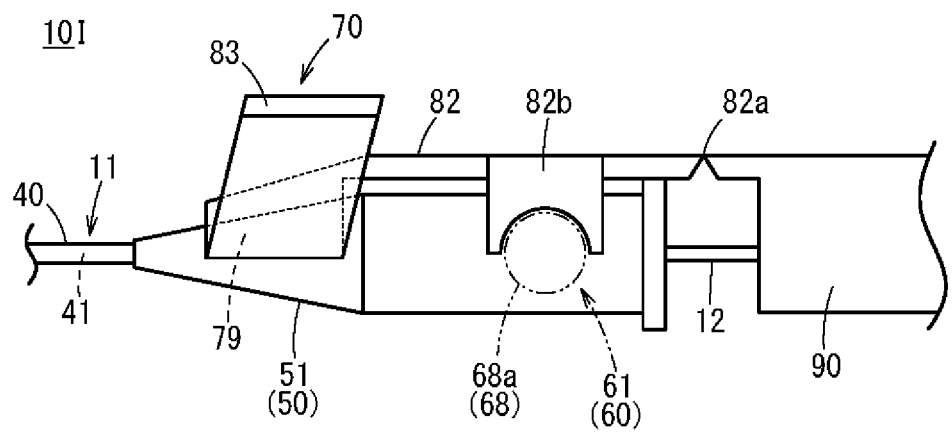
FIG. 14A is a first side view illustrating an operation of a catheter operation member of the catheter assembly of FIG. 12.

The catheter operation member 70 has a central base 82 that is detachably connected to the proximal portion of the main hub 51, and a pair of finger hooks 83 that extend from the central base 82 to both sides in the width direction. As illustrated in FIGS. 13 and 14A, the central base 82 extends in the longitudinal direction of the housing 30, locks the main hub 51 on the distal side, and is connected to the safety mechanism 90 on the proximal side of the main hub 51. A hinge 82a that can fold the catheter operation member 70 is formed at a boundary of the central base 82 between the main hub 51 and the safety mechanism 90. In addition, the pair of finger hooks 83 are inclined upward toward the outside in the width direction, and a plurality of anti-slip protrusions (not illustrated) are provided on lower surfaces thereof.

Further, the catheter assembly 10I has a guide wire 120 and a guide wire operation member 122. The guide wire 120 is arranged in the hollow portion 14 of the inner needle 12, and has a distal end standing by near the needle tip 13 in the initial state. The guide wire operation member 122 is connected to a proximal portion of the guide wire 120 via an intermediate connecting portion (not illustrated) arranged inside the housing 30. When the guide wire operation member 122 is displaced in the distal direction with respect to the upper housing 31, its operating force is transmitted to the guide wire 120, and the guide wire 120 is sent out from the distal opening 14a of the needle tip 13.

In the catheter assembly 10I, the sub-hub 61 is connected, via the relay tube 58, to the main hub 51 through which the inner needle 12 is inserted and in which the catheter operation member 70 is formed. In the initial state, most of the sub-hub 61 is exposed from the slit 30a between the upper housing 31 and the lower housing 32. In addition, the sub-hub 61 is configured to move in a dependent manner when the main hub 51 moves under the operation of the catheter operation member 70.

Specifically, the distal portion of the sub-hub 61 is provided with a structural portion 68 that can be caught by an edge of the housing 30 forming the slit 30a. The structural portion 68 has a first disc portion 68a at its distal end and a second disc portion 68b at a position slightly separated from the first disc portion 68a toward the proximal side. In the initial state, edges of the upper housing 31 and the lower housing 32 forming the slit 30a are inserted into a gap between the first disc portion 68a and the second disc portion 68b. As a result, the sub-hub 61 moves along the slit 30a in a state in which the upper housing 31 and the lower housing 32 are in close proximity to each other.

In addition, the first disc portion 68a is configured to be capable of receiving a moving force from the flange portion 55c of the main hub 51 or the catheter operation member 70. For example, the catheter operation member 70 has an extension portion 82b along the side circumferential surface of the main hub 51 from the central base 82 on the proximal side of the pair of finger hooks 83. The extension portion 82b is configured to appropriately lock the main hub 51 and lock a circumferential edge of the first disc portion 68a.

During the use, the catheter assembly 10I configured as described above punctures a patient with the multi-structure needle 11 (the inner needle 12 and catheter 40) by a user. At this time, the sub-hub 61 connected to the relay tube 58 is interposed between the upper housing 31 and the lower housing 32, and is restricted from being freely displaced. That is, the housing 30 (the needle hub 20) functions as a restriction portion 100I in the catheter assembly 10I.

The user operates the guide wire operation member 122 in the distal direction in a puncture state of the multi-structure needle 11 such that the guide wire 120 protrudes from the distal end of the inner needle 12 and is inserted into a blood vessel. Then, the user operates the catheter operation member 70 in the distal direction to move the catheter 40, the main hub 51, and the sub-hub 61 forward. During this movement, the upper housing 31 is pushed upward by the catheter operation member 70 to be open with respect to the lower housing 32. The withdrawal of the upper housing 31 enables the right distal portion 32R and the left distal portion 32L of the lower housing 32 to be further separated from each other in the left-right direction. As a result, the catheter operation member 70 is allowed to be withdrawn from the housing 30 in the distal direction.

Figure 14B:
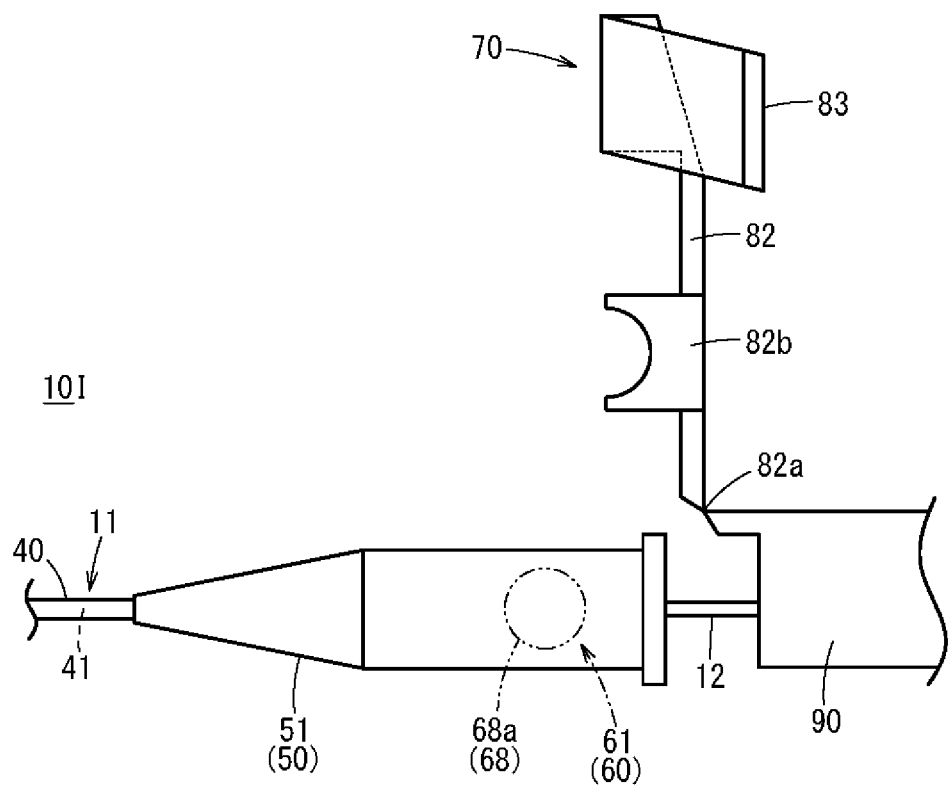
FIG. 14B is a second side view illustrating the operation of the catheter operation member of the catheter assembly of FIG. 12.

Then, the user pulls the housing 30 in the proximal direction with respect to the catheter 40, the main hub 51, and the like to remove the inner needle 12 from the main hub 51. The sub-hub 61 is also exposed from the housing 30 to transition to a free state. After the removal of the inner needle 12, the user rotates the distal side of the catheter operation member 70 (the central base 82) upward about the hinge 82a as illustrated in FIG. 14B to release the locked state between the catheter operation member 70 and the main hub 51, and the sub-hub 61. As a result, the catheter 40, the main hub 51, and the sub-hub 61 indwell on the patient side.

As described above, this catheter assembly 10I can also obtain the same effects as those of the above-described catheter assemblies 10A to 10H. That is, the free displacement of the sub-hub 61 is restricted even if the housing 30 functions as the restriction portion 100I, and thus, the usability can be improved. In addition, the sub-hub 61 protrudes outward in the lateral direction of the housing 30 in the catheter assembly 10I, and thus, the main hub 51 is mainly stored inside the housing 30 substantially. As a result, a size of the housing 30 can be reduced, and the gripping and the operation performed by the user can be facilitated.

Ninth Modification

Figure 15A:
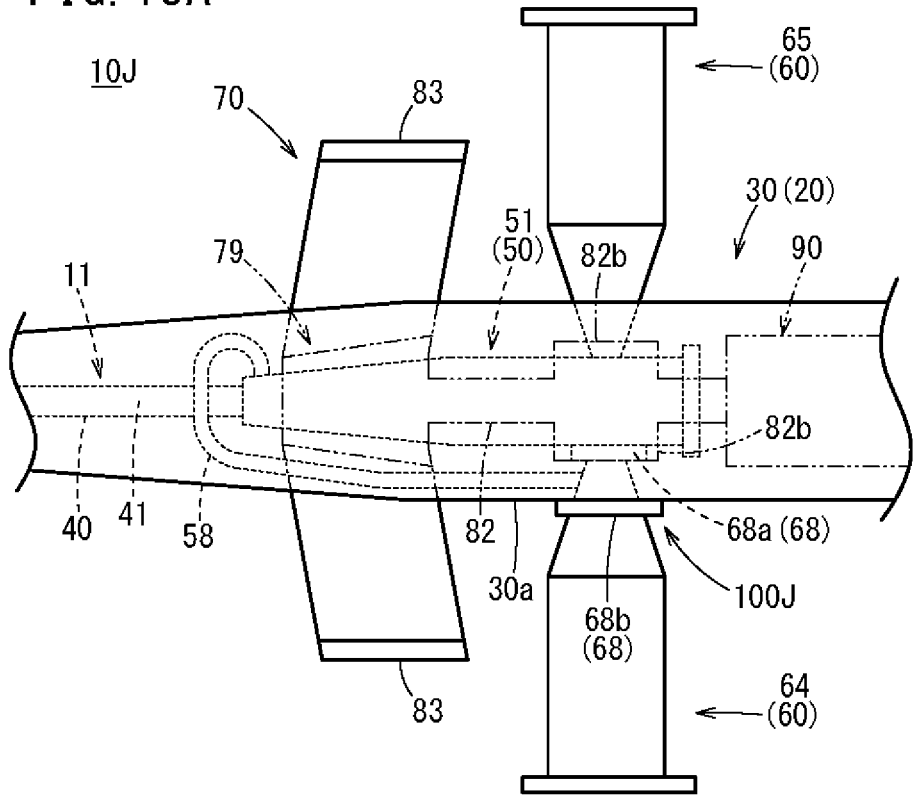
FIG. 15A is a partial plan view of a catheter assembly according to a ninth modification.

As illustrated in FIG. 15A, a catheter assembly 10J according to a ninth modification is different from the above-described catheter assemblies 10A to 10I in that the first sub-hub 64 and the second sub-hub 65 are connected to the main hub 51 and the first and second sub-hubs 64 and 65 protrude outward in the width direction through the slit 30a of the housing 30. In the catheter assembly 10J, the first sub-hub 64 is configured in the same manner as the sub-hub 61 of the eighth modification, and the second sub-hub 65 is directly connected to a side circumferential surface of the barrel portion 55a of the main hub 51.

In this manner, the catheter assembly 10J can form a restriction portion 100J in which the free displacement of the first sub-hub 64 is restricted by the housing 30 and the free displacement of the second sub-hub 65 is restricted by the main hub 51. In addition, the catheter operation member 70 can move the main hub 51 and the first and second sub-hubs 64 and 65 together under a user's operation.

Tenth Modification

Figure 15B:
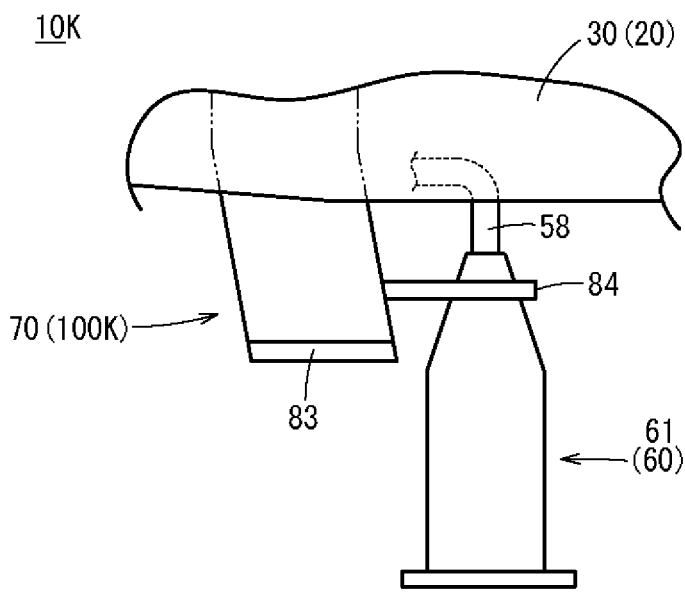
FIG. 15B is a partial plan view of a catheter assembly according to a tenth modification.

As illustrated in FIG. 15B, a catheter assembly 10K according to a tenth modification is configured such that the sub-hub 61 is exposed to the outer side in the width direction of the housing 30 and the sub-hub 61 is locked to one finger hook 83 of the catheter operation member 70. In this case, the finger hook 83 is provided with a locking arm 84 that locks the sub-hub 61. For example, the locking arm 84 extends from the finger hook 83 in the proximal direction, and has an extending end formed in a C shape in a side view. Then, a predetermined portion of the sub-hub 61 is locked inside the C shape. Even if the catheter assembly 10K is configured in this manner, the catheter operation member 70 functions as a restriction portion 100K so that the free displacement of the sub-hub 61 can be restricted.

Eleventh Modification

As illustrated in FIGS. 16A to 17B, a catheter assembly 10L according to an eleventh modification is different from the above-described catheter assemblies 10A to 10K in that the catheter operation member 70 forms a restriction portion 100L although the sub-hub 61 is exposed from the slit 30a of the housing 30 similarly to the eighth modification.

The catheter operation member 70 has the locking portion 79 that locks the main hub 51 at a distal portion of the central base 82, and the pair of finger hooks 83 protrude outward in the width direction at a central portion in the longitudinal direction of the central base 82. In addition, the central base 82 has the hinge 82a at the boundary with respect to the safety mechanism 90 on the proximal side of the main hub 51, and includes a protruding wall 85 that protrudes downward (to the gap between the main hub 51 and the safety mechanism 90) on the proximal side of the hinge 82a. The protruding wall 85 has a support plate 86 extending in the distal direction on a side located on one side in the width direction in which the sub-hub 61 is arranged.

The support plate 86 extends on a lower side separated from the finger hook 83 at a predetermined interval so as to be parallel with the central base 82, and reaches a distal end of the finger hook 83. The catheter operation member 70 locks the sub-hub 61 by causing the sub-hub 61 to be interposed between the finger hook 83 and the support plate 86. The sub-hub 61 includes a locked block 63d at a distal end of the tapered portion 63b, and the relay tube 58 is connected to a side circumferential surface of the tapered portion 63b. The locked block 63d is configured to fit into locking grooves 83a and 86a provided on a lower surface of the finger hook 83 and an upper surface of the support plate 86. As a result, the catheter operation member 70 functions as the restriction portion 100L that restricts the free displacement of the sub-hub 61.

Figure 16A:
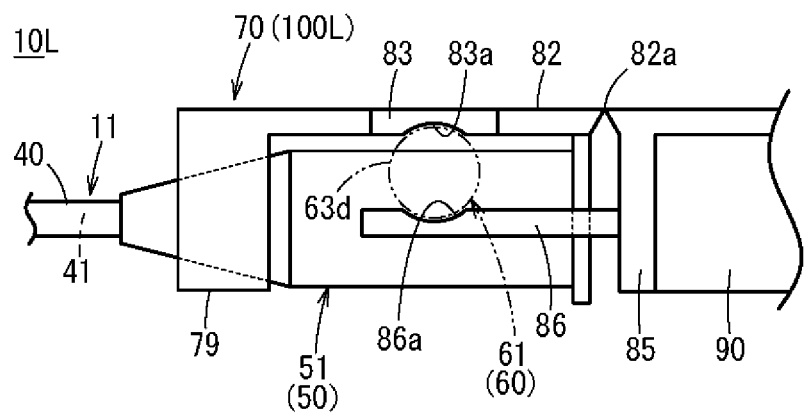
FIG. 16A is a partial side view of a catheter assembly according to an eleventh modification.
Figure 16B:
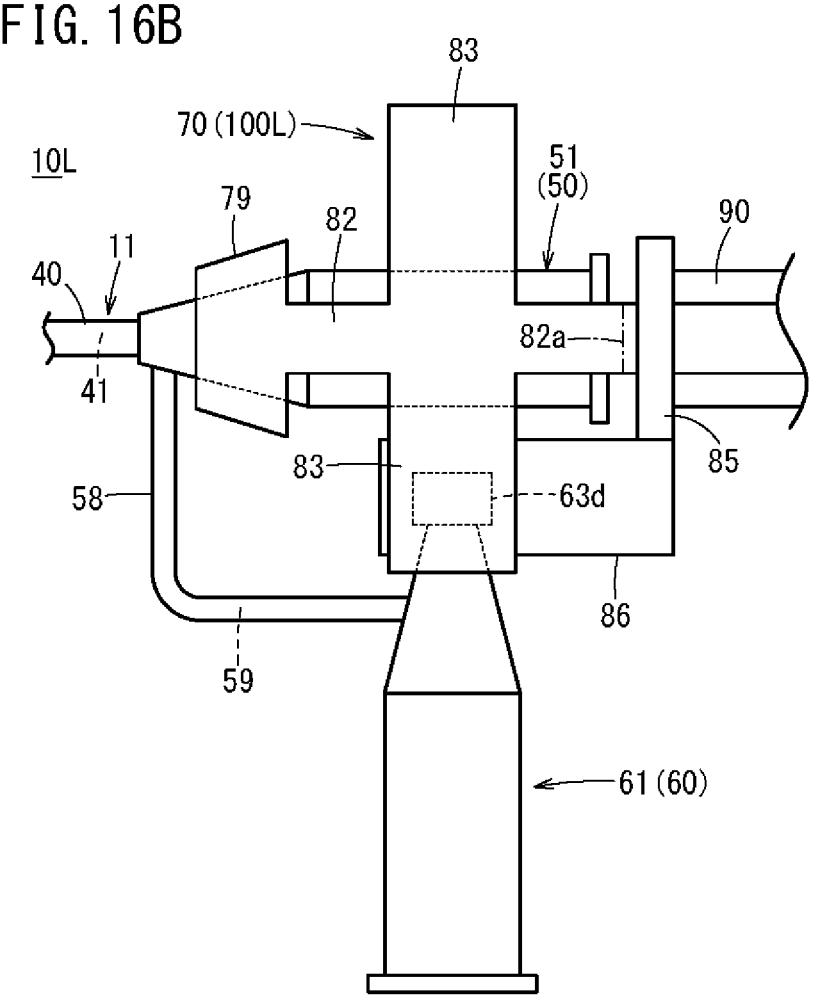
FIG. 16B is a partial plan view of the catheter assembly of FIG. 16A.
Figure 17A:
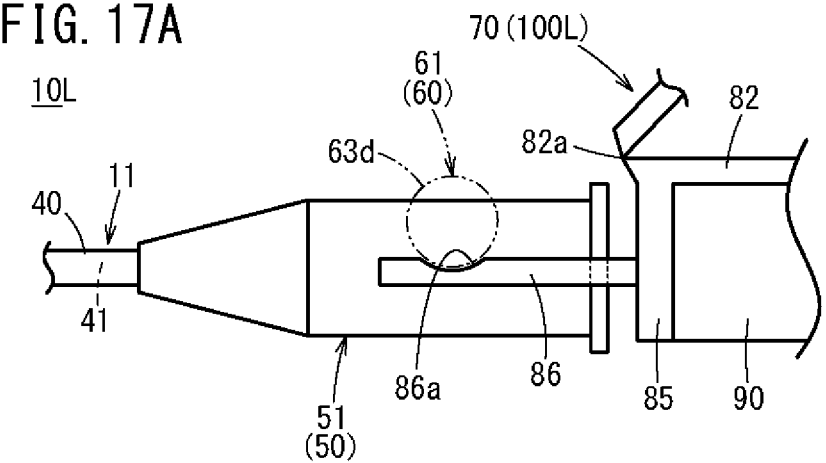
FIG. 17A is a partial side view illustrating an operation of a catheter operation member of FIG. 16A.
Figure 17B:
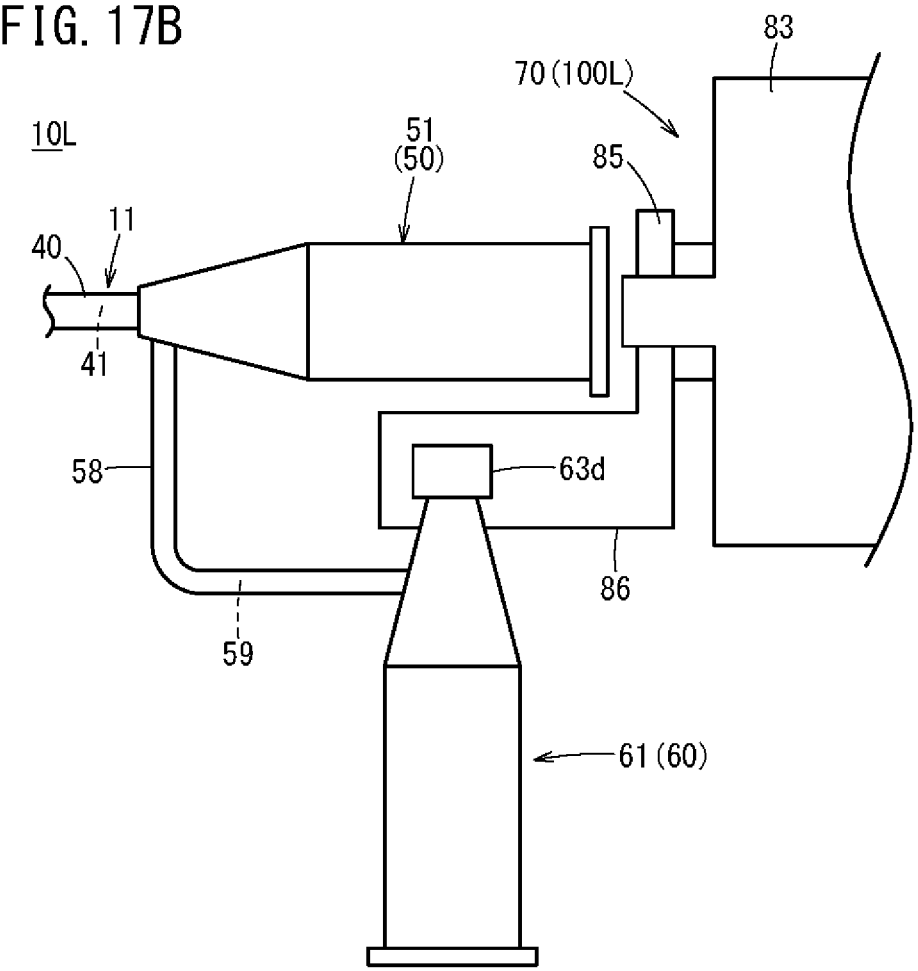
FIG. 17B is a partial plan view illustrating the operation of the catheter operation member of FIG. 16B.

In the catheter assembly 10L configured as described above, the rotation of the catheter operation member 70 is restricted inside the housing 30 as illustrated in FIGS. 16A and 16B so that the sub-hub 61 (the locked block 63d) is favorably interposed between the finger hook 83 and the support plate 86. As the catheter operation member 70 is exposed from the housing 30 along with the advancing operation, the distal side of the central base 82 can be rotated about the hinge 82a as illustrated in FIGS. 17A and 17B. As a result, the finger hook 83 is separated from the support plate 86, and the sub-hub 61 (the locked block 63d) that has been interposed can be set to a free state.

Twelfth Modification

Figure 18:
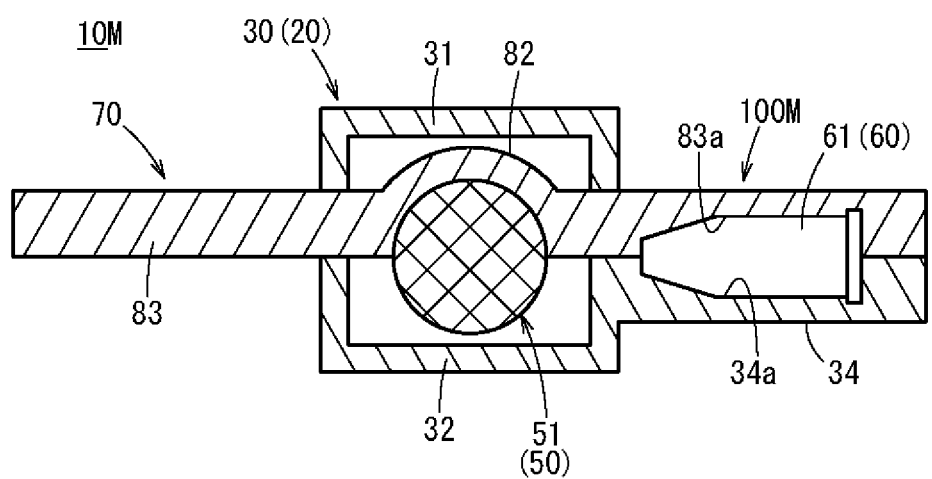
FIG. 18 is a schematic cross-sectional view of a catheter assembly according to a twelfth modification.

As illustrated in FIG. 18, a catheter assembly 10M according to a twelfth modification is different from the above-described catheter assemblies 10A to 10L in that a support plate 34 is provided in the housing 30, such that the sub-hub 61 is interposed between the finger hook 83 of the catheter operation member 70 and the support plate 34. In this case, the locking groove 83a that matches an outer shape of the sub-hub 61 is provided on the lower surface of the finger hook 83. On the other hand, the support plate 34 of the housing 30 extends toward the distal direction on one side wall of the lower housing 32. A guide groove 34a extending toward the distal direction is formed on an upper surface of the support plate 34 in a shape that matches the outer shape of the sub-hub 61. That is, the guide groove 34a has a function of guiding the sub-hub 61 when the sub-hub 61 moves along with the movement of the finger hook 83. In this manner, the catheter assembly 10M can also form a restriction portion 100M that restricts the free displacement of the sub-hub 61 bay causing the housing 30 and the catheter operation member 70 to cooperate with each other.

Thirteenth Modification

Figure 19A:
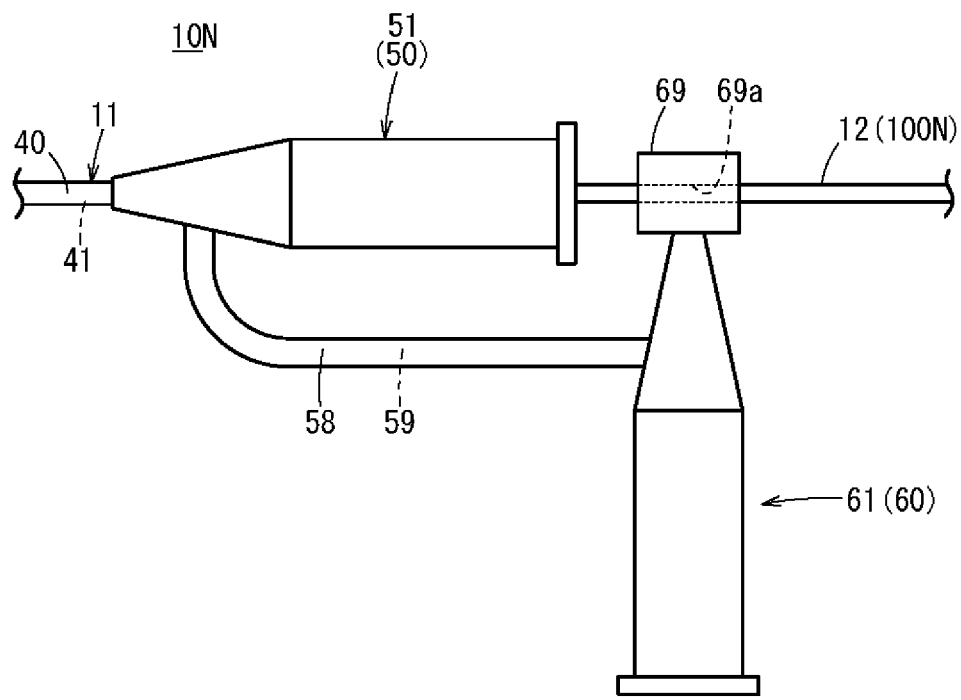
FIG. 19A is a first partial plan view of a catheter assembly according to a thirteenth modification.
Figure 19B:
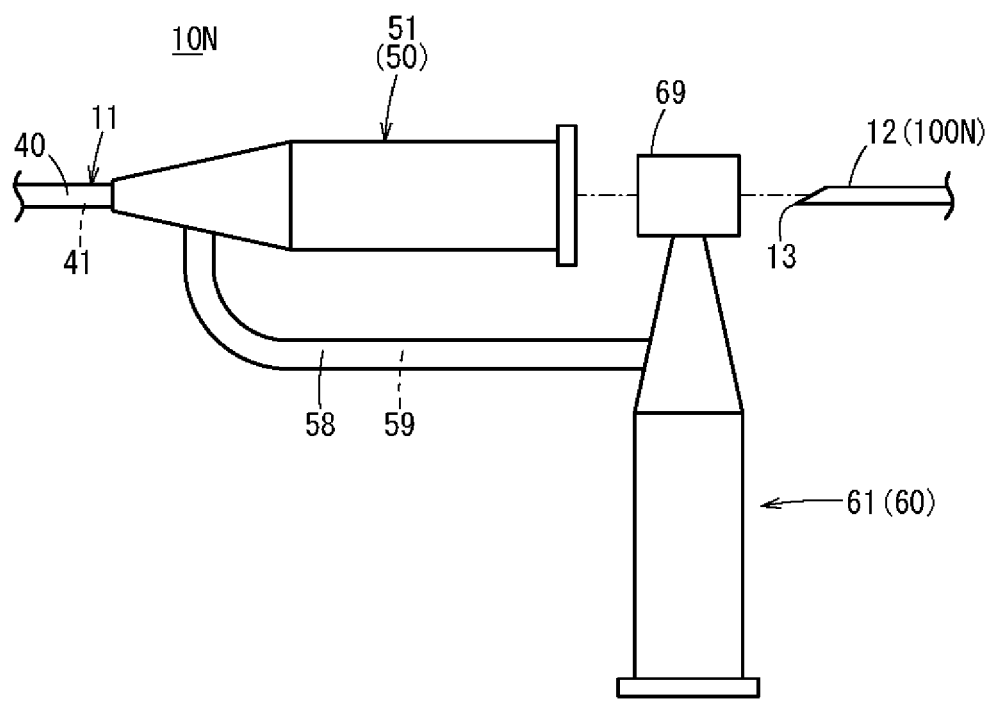
FIG. 19B is a second partial plan view illustrating an operation of the catheter assembly of FIG. 19A.

As illustrated in FIGS. 19A and 19B, a catheter assembly 10N according to a thirteenth modification is different from the above-described catheter assemblies 10A to 10M in that the sub-hub 61 includes an insertion target body 69 through which the inner needle 12 is inserted. Although not illustrated in detail, the catheter assembly 10N adopts the housing 30 similar to that of the eighth modification, and the sub-hub 61 is exposed to the outer side in the width direction from the slit 30a.

The insertion target body 69 is provided with an insertion hole 69a in a direction orthogonal to the axial direction of the sub-hub 61, and the inner needle 12 is inserted into the insertion hole 69a in an initial state. The insertion hole 69a does not communicate with the sub-space portion 62 inside the sub-hub 61 communicating with the tube lumen 59 of the relay tube 58. That is, the catheter assembly 10N can cause the inner needle 12 to function as a restriction portion 100N that restricts the free displacement of the sub-hub 61 even in the housing 30 having the slit 30a.

Fourteenth Modification

As illustrated in FIGS. 20A and 20B, a catheter assembly 10O according to a fourteenth modification is different from the above-described catheter assemblies 10A to 10N in terms of including a clamp 130 that exposes the relay tube 58 and the sub-hub 61 from the housing 21 and the catheter operation member 70 to make the relay tube 58 bundled. That is, a restriction portion 100O that restricts the free displacement of the sub-hub 61 is configured by the clamp 130 in this catheter assembly 10O.

Specifically, the clamp 130 is configured to engage with the relay tube 58 at a plurality of spots (two spots in FIG.

20B) to make the relay tube 58 bundled in a folded state. The clamp 130 is formed in a rectangular shape in a plan view, and has a first engagement space 131 on one end side and a second engagement space 132 on the other end side.

The first engagement space 131 is constituted by a set of long arms 134 extending from a base 133 between the first engagement space 131 and the second engagement space 132. Each of the long arms 134 is formed so as to be thick on the base 133 side be thin on an extending end side, thereby forming a first site 131a in which the tube lumen 59 is engaged in a non-closing state and a second site 131b in which the tube lumen 59 is engaged in a closing state. The set of long arms 134 is formed such that one is short and the other orbits the first site 131a to wrap around on one side, and has an insertion gap 131c that allows insertion of the relay tube 58 between the one and the other.

On the other hand, the second engagement space 132 is constituted by a set of short arms 135 extending from the base 133 in the opposite direction to the long arm 134, and engages with the tube lumen 59 of the relay tube 58 in a non-closing state. The set of short arms 135 is formed in symmetric shapes, and forms an insertion gap 132a in a portion protruding inward on a protruding end side. In addition, the set of short arms 135 has a thin portion 135a, which facilitates opening of the short arm 135 to the outer side, at a boundary with respect to the base 133.

The clamp 130 configured in this manner engages with the relay tube 58 in the folded state at two appropriate spots to shorten the distance from the notch 80 of the catheter operation member 70 to the sub-hub 61 and restrict (suppress) the free displacement of the sub-hub 61 with respect to the main hub 51. In addition, the clamp 130 smoothly expands the short arms 135 at an appropriate timing under a user's operation. As a result, the relay tube 58 can be easily taken out from the second engagement space 132, and the relay tube 58 can be used in the state of being extended long.

Fifteenth Modification

Figure 21A:
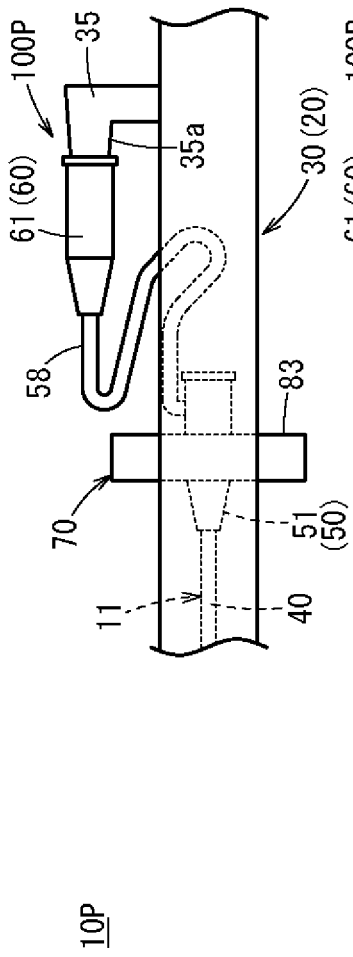
FIG. 21A is a first partial plan view of a catheter assembly according to a fifteenth modification.
Figure 21B:
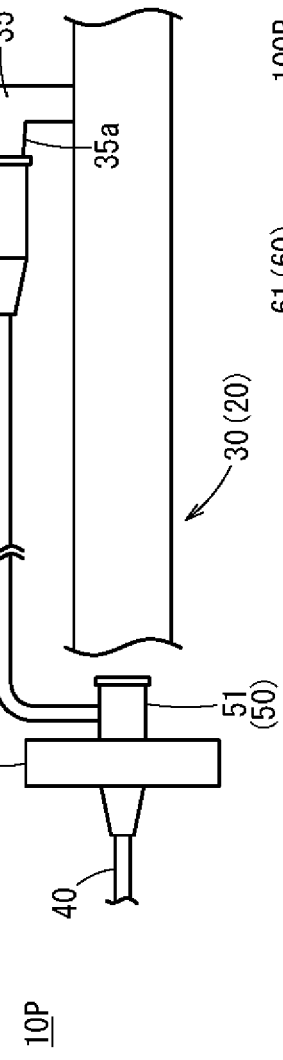
FIG. 21B is a second partial plan view illustrating an operation of the catheter assembly of FIG. 21A.
Figure 21C:
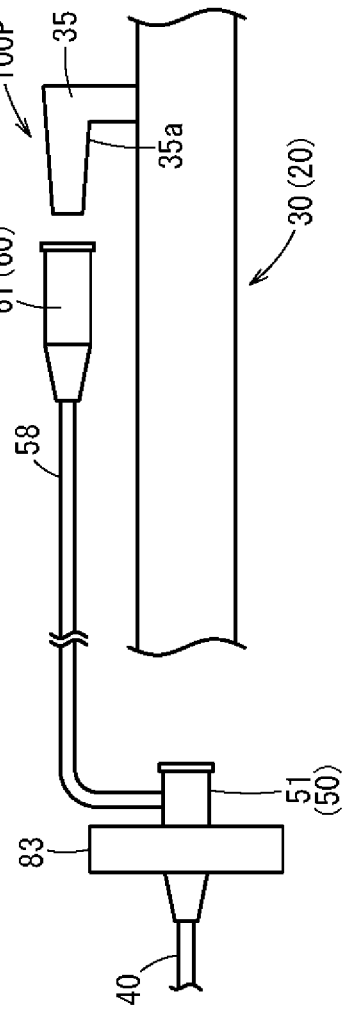
FIG. 21C is a third partial plan view illustrating the operation of the catheter assembly of FIG. 21A.

As illustrated in FIGS. 21A to 21C, a catheter assembly 10p according to a fifteenth modification is different from the above-described catheter assemblies 10A to 10O in that a support body 35 supporting the sub-hub 61 in an initial state is provided on the outer side in the width direction of the housing 30. For example, the support body 35 protrudes outward in the width direction from the side wall 23 on the proximal side of the housing 30, and protrudes in the distal direction via an intermediate bent portion. A tapered protrusion 35a, which can be fitted to the inner circumferential surface (luer taper) of the sub-hub 61 forming the sub-space portion 62 with an appropriate fitting force, is provided at a protruding end in the distal direction.

That is, the sub-hub 61 and the support body 35 (tapered protrusion 35a) are fitted to each other in the initial state of the catheter assembly 10P as illustrated in FIG. 21A. The relay tube 58 connected to the sub-hub 61 is connected to the main hub 51 through the slit 30a of the housing 30. When the catheter operation member 70 is moved forward at the time of inserting the catheter 40 as illustrated in FIG. 21B, only the main hub 51 moves forward to be exposed from the distal end of the housing 30. At this time, the sub-hub 61 is continuously supported by the support body 35. When the main hub 51 is further pulled in the distal direction of the housing 30 in the state in which the main hub 51 is exposed, the sub-hub 61 is pulled by the relay tube 58 as illustrated in FIG. 21C. When this tensile force exceeds a fitting force, the sub-hub 61 comes out of the support body 35 and becomes a free state to favorably indwell in a patient.

As described above, the catheter assembly 10P can cause the support body 35 provided on the lateral side of the housing 30 to function as a restriction portion 100P, thereby restricting the free displacement of the sub-hub 61 exposed from the housing 30.

Sixteenth Modification

Figure 22A:
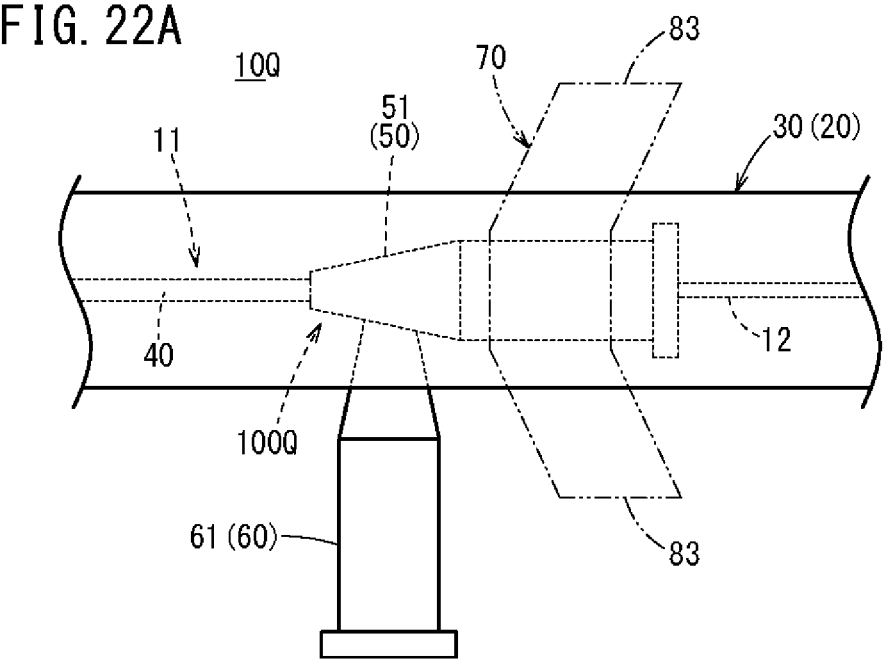
FIG. 22A is a partial plan view schematically illustrating a catheter assembly according to a sixteenth modification.

As illustrated in FIG. 22A, a catheter assembly 10Q according to a sixteenth modification is different from the above-described catheter assemblies 10A to 10P in that the sub-hub 61 is directly connected to the main hub 51. For example, the sub-hub 61 is connected in a direction orthogonal to the axial direction of the main hub 51 (the width direction of the housing 30), and protrudes outward in the width direction of the housing 30 from the accommodation space 24 of the housing 30 through the slit 30a.

In this catheter assembly 10Q, the main hub 51 and the sub-hub 61 are connected without passing through the relay tube 58 so that the main hub 51 serves as a restriction portion 100Q that restricts the free displacement of the sub-hub 61. That is, he sub-hub 61 can be held more firmly by eliminating the relay tube 58 in the configuration in which the main hub 51 and the sub-hub 61 are connected.

Seventeenth Modification

Figure 22B:
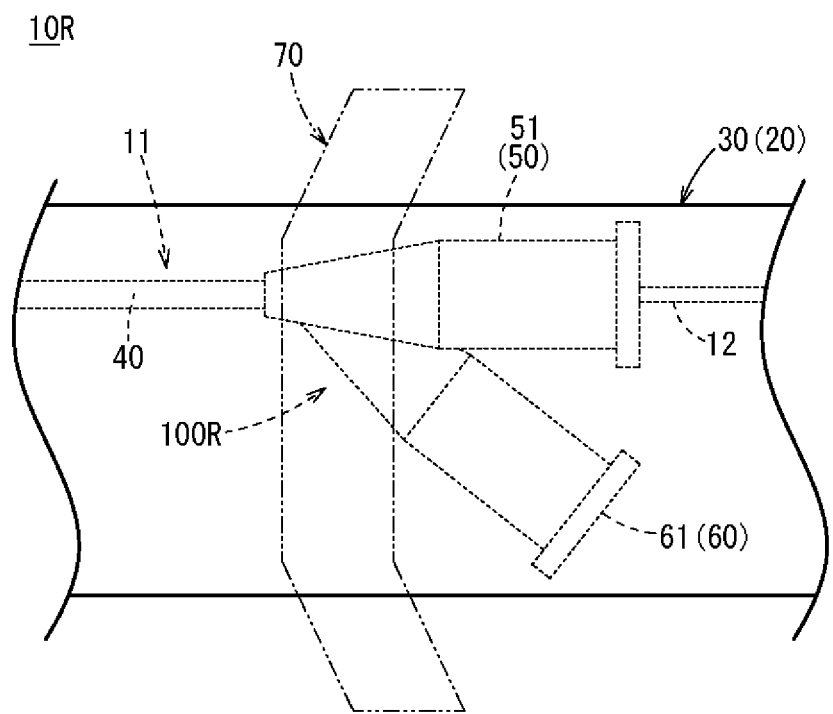
FIG. 22B is a partial plan view schematically illustrating a catheter assembly according to a seventeenth modification.

As illustrated in FIG. 22B, a catheter assembly 10R according to a seventeenth modification is different from the above-described catheter assemblies 10A to 10Q in that the sub-hub 61 is accommodated in the housing 30 (or the catheter operation member 70) together with the main hub 51 although the main hub 51 and the sub-hub 61 are connected without passing through the relay tube 58. In this case, a restriction portion 100R that restricts the free displacement of the sub-hub 61 serves as the main hub 51. Because the sub-hub 61 is provided so as to be inclined in the axial direction of the main hub 51, each width of the housing 30 and the catheter operation member 70 can be reduced. Because the sub-hub 61 is accommodated in the housing 30, the catheter assembly 10R can suppress contact with the sub-hub 61 during a user's operation.

Technical ideas and effects that can be grasped from the above-described embodiments are described as follows.

The catheter assemblies 10A to 10R include the connector 60 configured to be connectable with a medical device and the restriction portions 100A to 100R that restrict the free displacement of the connector 60 with respect to the catheter hub 50. As a result, it is possible to prevent the connector 60 from interfering with the user's operation during the puncturing in which the inner needle 12 and the catheter 40 are punctured and during the insertion in which the catheter 40 is inserted into the body. That is, the catheter assemblies 10A to 10R can be significantly improved in usability even in the configuration in which the connector 60 is connected to the catheter hub 50.

In addition, the restriction portions 100A to 100C and 100I to 100M are provided in the catheter operation member 70. As a result, the catheter assemblies 10A to 10C and 10I to 10M can cause the connector 60 to move in conjunction with the movement of the catheter operation member 70. Therefore, the usability of the catheter assemblies 10A to 10C and 10I to 10M is further enhanced.

In addition, the needle hub 20 is configured as the housing 21 that accommodates the catheter hub 50 inside in the initial state, and the catheter operation member 70 accommodates the connector 60 movably inside the housing 21. Because the connector 60 is accommodated by the housing 21 and the catheter operation member 70 in this manner, the catheter assemblies 10A to 10C can more reliably restrict the free displacement of the connector 60.

In addition, an axial center of the connector 60 is accommodated in the housing 21 in a state of being shifted outward in the radial direction with respect to an axial center of the catheter hub 50. As a result, the catheter assemblies 10A and 10B can suppress the free displacement of the connector 60 even in the configuration in which the inner needle 12 is not inserted through the connector 60.

In addition, the connector 60 is accommodated in the housing 21 in the state of being shifted to the distal side or the proximal side with respect to the catheter hub 50. As a result, the catheter assemblies 10A and 10B can move the connector 60 as close as possible to the axis of the catheter hub 50, and can reduce the size of the housing 21 even in the configuration in which the connector 60 is accommodated in the housing 21.

In addition, it may be configured such that the connector 60 is connected to the catheter hub 50 via the relay tube 58 and is exposed to the outside of the catheter operation member 70, and the catheter operation member 70 has the notch 80 through which the relay tube 58 passes and by which the relay tube 58 can be caught. Even when the relay tube 58 is caught by the notch 80 of the catheter operation member 70 in the catheter assembly 10C in this manner, the free displacement of the connector 60 exposed to the outside can be restricted.

In addition, it may be configured such that the needle hub 20 is configured as the housing 30 that accommodates the catheter hub 50 and a part of the catheter operation member 70 inside in the initial state, and has the slit 30a that exposes a part of the catheter operation member 70 on the lateral side of the housing 30, and the connector 60 is exposed to the outside of the housing 30 through the slit 30a and is detachably engaged with the catheter operation member 70. Even in the configuration in which the connector 60 is exposed to the outside through the slit 30a of the housing 30 in the catheter assemblies 10I to 10M in this manner, the free displacement of the connector 60 can be restricted by the catheter operation member 70.

In addition, the connector 60 may have the structural portion 68 that can be caught by the edge, which forms the slit 30a, of the housing 30. In this manner, when the structural portion 68 of the connector 60 is caught by the edge of the housing 30 in addition to the configuration of the restriction portion 100I using the catheter operation member 70 in the catheter assembly 10I, the free displacement of the connector 60 can be more reliably restricted.

In addition, it may be configured such that the connector 60 accommodated in the housing 30 is interposed between parts of the catheter operation member 70, and the interposing of the connector 60 can be released as the catheter operation member 70 transitions to the state of being exposed from the housing 30. As a result, the catheter operation member 70 can hold the connector 60 more reliably, and the free displacement of the connector 60 can be favorably restricted.

In addition, the connector 60 may be interposed between the catheter operation member 70 and the housing 30, and the interposing of the connector 60 may be released as the catheter operation member 70 transitions to the state of being exposed from the housing 30. In this manner, the catheter assembly 10M can also restrict the free displacement of the connector 60 by interposing the connector 60 between the catheter operation member 70 and the housing 30.

In addition, the restriction portions 100D to 100H and 100N can be configured to function by the inner needle 12 being inserted through the connector 60. In the catheter assembly 10D to 10H and 10N, the free displacement of the connector 60 can be reliably restricted by the inner needle 12 functioning as the restriction portion 100D to 100H and 100N.

In addition, the connector 60 may be arranged inside the needle hub 20 in a state of being aligned in the axial direction of the catheter hub 50. Because the catheter assemblies 10D to 10H have the catheter hub 50 and the connector 60 arranged side by side in the axial direction, the size of the needle hub 20 can be significantly reduced, which facilitates the gripping and the operation performed by the user.

In addition, the connector 60 includes the valve body 66 on the distal side of the space (sub-space portion 62) inside the connector 60, and the valve body 66 allows the insertion of the inner needle 12 and is closed along with withdrawal of the inner needle 12. Because the connector 60 includes the valve body 66, the space inside the connector 60 can be closed when the inner needle 12 is withdrawn, and the leakage of fluid such as the medicinal liquid can be reliably eliminated. As a result, the catheter assemblies 10D to 10H can smoothly guide the fluid into the catheter 40 through the connector 60.

In addition, the connector 60 preferably has the connection mechanism 67 that achieves the connection so as to be capable of following the movement of the catheter hub 50. In the catheter assemblies 10E to 10H, the catheter 40 and the connector 60 can be moved together by the connection mechanism 67.

In addition, the restriction portions 100I, 100J, 100M, and 100P may be provided on the needle hub 20. Even when the needle hub 20 is provided with the restriction portions 100I, 100J, 100M, and 100P in the catheter assembly 10I, 10J, 10M, and 10P, the free displacement of the connector 60 can be favorably restricted.

In addition, the connector 60 is connected to the catheter hub 50 via the relay tube 58 and is exposed to the outside of the needle hub 20, and the needle hub 20 has the support body 35 that fits into the connector 60 to support the connector 60. The catheter assembly 10P can suppress the free displacement of the connector 60 even in the configuration in which the connector 60 is supported by the support body 35 of the needle hub 20.

In addition, the connector 60 is connected to the catheter hub 50 via the relay tube 58, and the restriction portion 100O may be the clamp 130 that can hold the relay tubes 58 in a bundled state. The catheter assembly 10O can also suppress the free displacement of the connector 60 by holding the relay tube 58 in the bundled state by the clamp 130.

In addition, the restriction portions 100J, 100Q, and 100R can also be configured by directly connecting the connector 60 to the catheter hub 50. As a result, the catheter assemblies 10J, 10Q, and 10R can more reliably suppress the free displacement of the connector 60 with respect to the catheter hub 50.

What is claimed is:
1. A catheter assembly comprising:
  an inner needle;
  a needle hub fixed to a proximal end of the inner needle, the needle hub comprising a housing;
  a catheter including:

a first lumen through which the inner needle is inserted, and a second lumen extending in parallel with the first lumen, the second lumen separated from the first lumen in a direction perpendicular to an axial direction of the first lumen;

a catheter hub through which the inner needle is inserted and that is located in the housing and fixed to a proximal end of the catheter, the catheter hub being in communication with the first lumen;

a catheter operation member configured to operate movement of the catheter and the catheter hub with respect to the inner needle;

a support portion that supports the catheter when the catheter is moved; and a connector that is connected to the catheter hub and is connectable with another medical device, the connector being in communication with the second lumen; wherein:

an upper side of the connector is covered by the catheter operation member, and a lower side of the connector is covered by the housing, and a longitudinal central axis of the connector is co-axial with a longitudinal central axis of the catheter hub.

2. The catheter assembly according to claim 1, wherein:
the catheter hub is located in the housing in an initial state of the catheter assembly, and
the catheter operation member movably accommodates the connector inside the housing.

3. The catheter assembly according to claim 2, wherein:
the connector is located in the housing such that the connector is shifted toward a distal side or a proximal side with respect to the catheter hub.

4. The catheter assembly according to claim 1, wherein:
the connector is arranged inside and aligned with the needle hub in an axial direction of the catheter hub.

5. The catheter assembly according to claim 1, wherein:
the connector comprises a valve body on a distal side of a space inside the connector, and
the valve body allows insertion of the inner needle and is closed along with withdrawal of the inner needle.

6. The catheter assembly according to claim 1, wherein:
the connector has a connection mechanism that achieves a connection so as to be capable of following movement of the catheter hub.

7. The catheter assembly according to claim 1, wherein:
the connector is connected to the catheter hub via a relay tube, and
the catheter assembly further comprises a clamp configured to hold the relay tube in a bundled state.

8. The catheter assembly according to claim 1, wherein:
the connector is connected directly to the catheter hub.

9. The catheter assembly according to claim 1, wherein:
the connector is located between a downward-facing surface of the catheter operation member and an upward-facing surface of the housing in a plane perpendicular to the longitudinal central axis of the catheter hub.

10. A catheter assembly comprising:
an inner needle;
a needle hub fixed to a proximal end of the inner needle, the needle hub comprising a housing that comprises a side wall;
a catheter including:
 a first lumen through which the inner needle is inserted, and
 a second lumen extending in parallel with the first lumen, the second lumen separated from the first lumen in a direction perpendicular to an axial direction of the first lumen;
a catheter hub through which the inner needle is inserted and that is located in the housing and fixed to a proximal end of the catheter, the catheter hub being in communication with the first lumen;
a catheter operation member configured to operate movement of the catheter and the catheter hub with respect to the inner needle, the catheter operation member comprising:
 an operation plate portion extending in a longitudinal direction of the needle hub, and
 a hub storage portion that is continuous with a proximal end of the operation plate portion and stores the catheter hub;
a support member that is rotatably coupled with the side wall of the housing and supports the catheter when the catheter is moved; and
a connector that is connected to the catheter hub and is connectable with another medical device, the connector being in communication with the second lumen; wherein:
an upper side of the connector is covered by the catheter operation member, and a lower side of the connector is covered by the housing, and
a longitudinal central axis of the connector is co-axial with a longitudinal central axis of the catheter hub.

11. The catheter assembly according to claim 10, wherein:
the connector is located between a downward-facing surface of the catheter operation member and an upward-facing surface of the housing in a plane perpendicular to the longitudinal central axis of the catheter hub.

12. A catheter assembly comprising:
an inner needle;
a needle hub fixed to a proximal end of the inner needle, the needle hub comprising a housing;
a catheter including:
 a first lumen through which the inner needle is inserted, and
 a second lumen extending in parallel with the first lumen;
a catheter hub through which the inner needle is inserted and that is located in the housing and fixed to a proximal end of the catheter, the catheter hub being in communication with the first lumen;
a catheter operation member configured to operate movement of the catheter and the catheter hub with respect to the inner needle;
a support portion that supports the catheter when the catheter is moved; and
a connector that is connected to the catheter hub via a relay tube and is connectable with another medical device, the connector being in communication with the second lumen; wherein:
an upper side of the connector is covered by the catheter operation member, and a lower side of the connector is covered by the housing, such that the connector is located between a downward-facing surface of the catheter operation member and an upward-facing surface of the housing in a plane perpendicular to a longitudinal central axis of the catheter hub,
an upper side of the catheter hub is covered by the catheter operation member, and a lower side of the catheter hub is covered by the housing, such that the catheter hub is located between the downward-facing surface of the catheter operation member and the upward-facing surface of the housing in the plane perpendicular to the longitudinal central axis of the catheter hub, and a longitudinal central axis of the connector is co-axial with the longitudinal central axis of the catheter hub.

13. The catheter assembly according to claim 12, wherein:
the connector is positioned distal of the catheter hub.

* * * * *